US005668340A

United States Patent [19]

Hashizume et al.

[11] Patent Number: 5,668,340

[45] Date of Patent: Sep. 16, 1997

[54] WIND INSTRUMENTS WITH ELECTRONIC TUBING LENGTH CONTROL

[75] Inventors: Hikaru Hashizume; Yutaka Washiyama, both of Hamamatsu, Japan

[73] Assignee: Kabushiki Kaisha Kawai Gakki Seisakusho, Shizuoka-ken, Japan

[21] Appl. No.: 340,210

[22] Filed: Nov. 16, 1994

[30] Foreign Application Priority Data

Nov. 22, 1993 [JP] Japan .................................... 5-316008
Nov. 22, 1993 [JP] Japan .................................... 5-316009

[51] Int. Cl.$^6$ ............................. G01H 1/18; G01H 1/32; G01H 3/12; G01H 3/14

[52] U.S. Cl. ................................. 84/742; 84/723; 84/743

[58] Field of Search ............................. 84/659, 723, 724, 84/725, 730, 742, 743, DIG. 9, DIG. 10, 661

[56] References Cited

U.S. PATENT DOCUMENTS

| | | | |
|---|---|---|---|
| 4,527,456 | 7/1985 | Perkins et al. | 84/654 |
| 5,056,400 | 10/1991 | Wachi et al. | 84/600 |
| 5,125,315 | 6/1992 | Kawashima | 84/619 |
| 5,131,310 | 7/1992 | Kunimoto | 84/604 |
| 5,149,904 | 9/1992 | Kamiya et al. | 84/723 |
| 5,354,947 | 10/1994 | Kunimoto et al. | 84/622 |
| 5,377,096 | 12/1994 | Ono | 364/176 |
| 5,408,042 | 4/1995 | Masuda | 84/661 |
| 5,420,932 | 5/1995 | Goodman | 381/71 |
| 5,438,156 | 8/1995 | Masuda et al. | 84/659 |
| 5,459,280 | 10/1995 | Masuda et al. | 84/622 |

*Primary Examiner*—William M. Shoop, Jr.
*Assistant Examiner*—Marlon T. Fletcher
*Attorney, Agent, or Firm*—Hill, Steadman & Simpson

[57] ABSTRACT

A wind instrument is provided with electronic tubing control. The wind instrument has at least a pair of an acoustic sensor and an acoustic actuator in a straight pipe portion of a wind instrument and an electronic control for supplying a delayed output of the acoustic sensor to the actuator to electronically control a change in pressure in a pipe by variably changing the delay amount in correspondence with a performance of the instrument thereby electronically changing the pitch of a produced musical tone.

21 Claims, 13 Drawing Sheets

WIND INSTRUMENTS WITH ELECTRONIC TUBING LENGTH CONTROL

BACKGROUND OF THE INVENTION

1. Field of the Invention

The present invention relates to a wind instrument with electronic tubing length control, which controls a musical tone to be generated by a wind instrument using electronic delay lines.

2. Description of the Prior Art

Conventional wind instruments are designed to change the pitch of a musical tone by changing the effective length of a straight pipe (cylindrical pipe) portion by a mechanical means. For example, the effective length of the straight pipe portion is changed by a valve system consisting of a plurality of piston cylinders in brasses such as a trumpet, a horn, a bass, or the like, by a slide pipe mechanism in brasses such as a trombone, or by a key mechanism for opening/closing a large number of tone holes in woodwinds.

However, wind instruments which change a pitch by mechanical means suffer a problem of difficult and troublesome working and adjustment of the mechanical means itself. For example, in the above-mentioned valve system, if the clearance between a piston and a cylinder or the clearance between a slide inner pipe and an outer pipe is large, a so-called "tone omission" phenomenon occurs, resulting in poor performance response. On the other hand, if the clearance is small, a piston or the like cannot be smoothly moved in response to a quick movement. For these reasons, the clearance must always be maintained to be about 20 to 50 μm. Since the piston and the cylinder always rub against each other, a high-performance material free from a wear or surface treatment is required. Furthermore, when an excessive force acts on, e.g., the piston, this portion is bent and becomes inoperative, thus easily causing failures.

As a conventional apparatus for generating musical tones, an electronic musical instrument using electronic delay lines which simulate musical tones generated by an acoustic musical instrument such as a wind instrument is known. Many such electronic musical instruments have been proposed in various developed forms. Of these electronic musical instruments, an electronic wind instrument converts a change in pressure of, e.g., an exhalation of a man into an electrical signal, and supplies the electrical signal to electronic delay lines. The electronic delay lines comprise, e.g., a nonlinear circuit for roughly approximating nonlinear characteristics generated in a reed. The electrical signal is delayed by a predetermined period of time via the electronic delay lines, and the delayed electrical signal is amplified. The amplified signal is supplied to a loudspeaker to be converted into an actual sound.

However, in the above-mentioned conventional electronic wind instrument, a player merely gives an input as an unilateral, initial condition free from physical feedback from the instrument. Therefore, the conventional electronic wind instrument cannot allow unification in emotion between the player and the instrument, and allows merely control inputs by the player.

SUMMARY OF THE INVENTION

The present invention has been made in consideration of the above-mentioned problems, and has as its object to satisfactorily control the pitch of a musical tone independently of any mechanical means.

It is another object of the present invention to provide a wind instrument, which has means for electronically processing an acoustic signal so as to realize emotional unification between a player and the instrument as in acoustic musical instruments.

In order to achieve the above objects, in an electronic tubing length control apparatus of the present invention, only a mechanical means is replaced by an electronic means, other portions use the corresponding portions of an acoustic musical instrument, and the scale is controlled by controlling the delay time using electronic switches. More specifically, an operation for converting an acoustic signal into an electrical signal using a sensor arranged in a straight pipe portion of a wind instrument, delaying the electrical signal by electronic delay lines, and re-converting the delayed electrical signal by an actuator arranged in the straight pipe portion is performed for a free-traveling wave and a reflected wave, so that the electronic means can equivalently control the length of the straight pipe portion of the wind instrument.

In other words, in the electronic tubing length control apparatus of the present invention, a sensor detects a wave traveling from the mouthpiece side of the wind instrument as an electrical signal, the electrical signal is delayed by a time corresponding to the length of the straight pipe portion using electronic delay lines, the delayed electrical signal is re-converted into an acoustic signal by an actuator arranged at the side of a flare-bell portion, and the acoustic signal is radiated from the bell as an actual sound. Note that a wave reflected by the bell is detected as an electrical signal by a sensor arranged at the side of the flare-bell, the electrical signal is delayed by the time corresponding to the length of the straight pipe portion again, the delayed electrical signal is re-converted into an acoustic signal by an actuator arranged at the mouthpiece side, and the acoustic signal returns to the mouthpiece end. In this case, unnecessary waves are absorbed by an active acoustic non-reflection end.

In another aspect of an electronic tubing length control apparatus of the present invention, a first sensor for converting an acoustic wave traveling from the mouthpiece side into an electrical signal and a first actuator for converting an input electrical signal into an acoustic wave and supplying an acoustic output to an entrance portion of a first straight pipe contiguous with the mouthpiece side are arranged in the entrance portion of the first straight pipe. In addition, a second sensor for converting a wave reflected by the exit into an electrical signal and a second actuator for converting an input electrical signal into an acoustic wave and supplying an acoustic output to an exit portion of a second straight pipe contiguous with a flare-bell portion are arranged in the exit portion of the second straight pipe. The output from the first sensor is delayed by a predetermined period of time using electronic delay lines, and the delayed output is supplied to the second actuator to drive the actuator. Furthermore, the output from the second sensor is delayed by a predetermined period of time using electronic delay lines, and the delayed output is supplied to the first actuator to drive the actuator.

In still another aspect, an electronic tubing length control apparatus of the present invention comprises a first straight pipe which is contiguous with a mouth pipe in which a mouthpiece is inserted, a second straight pipe which is interposed between the first straight pipe and a flare-bell, a first actuator which is connected to the first straight pipe to supply an acoustic output to a first predetermined position of the mouth pipe side, a second actuator which is connected to the second straight pipe to supply an acoustic output to a second predetermined position of the side of the flare-bell, a first sensor which is arranged at the first predetermined position on the pipe wall of the first straight pipe, a second sensor which is arranged at the second predetermined position on the pipe wall of the second straight pipe, a first delay line for electronically delaying the output from the first sensor, and a second delay line for electronically delaying the output from the second sensor. The output from the first sensor, which is electronically delayed by the first delay line, is supplied to the second actuator, and the output from the second sensor, which is electronically delayed by the second delay line, is supplied to the first actuator.

According to a preferred aspect of the present invention, the first sensor is arranged near the mouthpiece, and the second sensor is arranged near the flare-bell.

According to another preferred aspect of the present invention, the output signals from the first and second sensors are A/D-converted into digital signals, and the digital signals are respectively input to the first and second electronic delay lines. The output signals from the first and second electronic delay lines are D/A-converted into analog signals, and the analog signals are respectively supplied to the first and second actuators.

According to still another preferred aspect of the present invention, the acoustic impedances of thin pipes for respectively connecting the first and second actuators and the first and second straight pipes are set to be sufficiently larger than the characteristic acoustic impedances of the first and second straight pipes.

According to still another preferred aspect of the present invention, the input signal to the first electronic delay line is obtained by subtracting a signal proportional to the signal supplied to the first actuator from the output signal from the first sensor, and the input signal to the second electronic delay line is obtained by subtracting a signal proportional to the signal supplied to the second actuator from the output signal from the second sensor.

According to still another preferred aspect of the present invention, the terminal end, opposite to the mouthpiece, of the first straight pipe is designed to be an acoustic non-reflection end, and the terminal end, opposite to the flare-bell, of the second straight pipe is designed to be an acoustic non-reflection end.

According to still another preferred aspect of the present invention, the acoustic non-reflection end comprises a pipe which has a length large enough to be regarded as an infinite length pipe by approximation.

According to still another preferred aspect of the present invention, the acoustic non-reflection end comprises active means.

According to still another preferred aspect of the present invention, the active means comprises a third actuator which is connected to the terminal end, opposite to the mouthpiece, of the first straight pipe via a thin pipe, and converts an output signal from a third electronic delay line, which receives the output from the first sensor, into an acoustic signal, and a fourth actuator which is connected to the terminal end, opposite to the flare-bell, of the second straight pipe via a thin pipe, and converts an output signal from a fourth electronic delay line, which receives the output from the second sensor, into an acoustic signal.

According to still another preferred aspect of the present invention, a binary code is generated in accordance with the setting position of a mechanical tubing length control apparatus such as a valve system, a slide pipe, or a key mechanism, and the delay times of the first and second delay lines are changed in correspondence with the binary code.

According to still another preferred aspect of the present invention, the delay times are finely adjusted in correspondence with the value of a variable resistor which is interlocked with the setting position of a mechanical tubing length control apparatus such as a trigger device or a slide pipe.

Since the present invention comprises the above-mentioned technical means, an acoustic wave traveling from the mouthpiece side is converted into an electrical signal by the sensor arranged in the straight pipe portion at the mouthpiece side, the electrical signal is delayed by a predetermined period of time by electronic delay lines, and the delayed electrical signal is supplied to the actuator arranged at the flare-bell side of the straight pipe portion to be re-converted into an acoustic wave, thus producing an actual sound from the bell.

The operation for converting an acoustic wave into an electrical signal, and the operation for re-converting the electrical signal into an acoustic wave are performed respectively for a free-traveling wave and a reflected wave, thereby equivalently controlling the effective length of a wind instrument by electronic means.

The operation for electronically controlling the effective length of the wind instrument will be described in detail below. First, the first sensor detects a sound wave traveling from the mouthpiece side to convert it into an electrical signal, and supplies the converted electrical signal to the first delay line.

The first delay line delays the input electrical signal by a time corresponding to the length of the straight pipe, and outputs the delayed signal to the actuator arranged at the flare-bell side. Upon reception of the delayed electrical signal, the actuator arranged at the flare-bell side re-converts the electrical signal into an acoustic wave, and produces an actual sound from the bell as a sound wave.

The sound wave reflected by the bell is detected by the second sensor arranged at the flare-bell side, and a corresponding electrical signal is supplied to the second delay line. The second delay line delays the input electrical signal by a time corresponding to the length of the straight pipe, and outputs the delayed electrical signal to the first actuator arranged at the mouthpiece side.

The electrical signal is converted into an acoustic wave by the first actuator, and the acoustic wave returns to the mouthpiece end. In this case, unnecessary waves are absorbed by the active non-reflection end.

As described above, the electronic tubing length control apparatus of the present invention controls the pitch by converting an acoustic wave into an electrical signal, and delaying the converted electrical signal by a time corresponding to the effective length of the straight pipe, thereby omitting mechanical means for changing the pitch.

Furthermore, a wind instrument according to the present invention, which has means for electronically processing an acoustic signal, uses a mouthpiece portion including a reed of, e.g., a flute, clarinet, oboe, or the like, or a mouthpiece portion of a brass without modifying a corresponding portion of an acoustic instrument, performs conversion between an acoustic signal and an electrical signal using sensors and actuators, and replaces only an acoustic pipe (straight pipe) portion as a linear system by electronic means.

More specifically, in a wind instrument according to the present invention, which has means for electronically processing an acoustic signal, a sensor is arranged at a predetermined position on a pipe wall portion, near a mouthpiece, of a straight pipe connected to the mouthpiece, the output from the sensor is input to a first electronic delay line, the output from the first electronic delay line is inverted by a load circuit, the inverted signal is input to a second electronic delay line, the output from the second electronic delay line is supplied to a first actuator which supplies an acoustic output to the predetermined position, the output from the load circuit is amplified, and the amplified signal is supplied to a loudspeaker, thus obtaining a musical tone output.

According to a preferred aspect of the present invention, the output from the sensor is A/D-converted into a digital signal, and the digital signal is input to the first electronic delay line. The output from the second electronic delay line is D/A-converted into an analog signal, and the analog signal is supplied to the first actuator.

According to another preferred aspect of the present invention, the acoustic impedance of a thin pipe for connecting the first actuator and the straight pipe is set to be sufficiently larger than the characteristic acoustic impedance of the straight pipe.

According to still another preferred aspect of the present invention, the input to the first electronic delay line is obtained by subtracting a signal proportional to a signal supplied to the first actuator from the output from the sensor.

According to still another preferred aspect of the present invention, the terminal end, opposite to the mouthpiece, of the straight pipe is designed to be an acoustic non-reflection end.

According to still another preferred aspect of the present invention, the acoustic non-reflection end comprises a pipe which has a length large enough to be regarded as an infinite length pipe by approximation.

According to still another preferred aspect of the present invention, the acoustic non-reflection end comprises active means.

According to still another preferred aspect of the present invention, the active means comprises a second actuator which is connected to the terminal end, opposite to the mouthpiece, of the straight pipe via a thin pipe, and converts an output from a third electronic delay line, which receives the output from the sensor, into an acoustic signal.

According to still another preferred aspect of the present invention, a binary code is generated in accordance with the setting position of a mechanical tubing length control apparatus such as a valve system, a slide pipe, or a key mechanism, and the delay times of the first and second delay lines are changed in correspondence with the binary code.

According to still another preferred aspect of the present invention, the delay times are finely adjusted in correspondence with the value of a variable resistor which is interlocked with the setting position of a mechanical tubing length control apparatus such as a trigger device or a slide pipe.

Since the wind instrument according to the present invention, which has means for electronically processing an acoustic signal, comprises the above-mentioned technical means, the sensor converts a sound wave traveling from the mouthpiece side into an electrical signal, delays the electrical signal by a time corresponding to the length of the straight pipe using the electronic delay lines, and converts the delayed signal into an acoustic signal again by an actuator to return the acoustic signal to a pipe body, so that a mechanism for controlling the effective tubing length in the wind instrument is realized by electronic means, and feedback from the instrument can be obtained.

In the wind instrument according to the present invention, which has means for electronically processing an acoustic signal, since only the straight pipe portion of the wind instrument is replaced by electronic means without modifying the mouthpiece portion, a player can play this instrument in the same style as an acoustic wind instrument.

DETAILED DESCRIPTION OF THE PREFERRED EMBODIMENTS

The first embodiment of the present invention will be described below with reference to the accompanying drawings.

Figure 1:
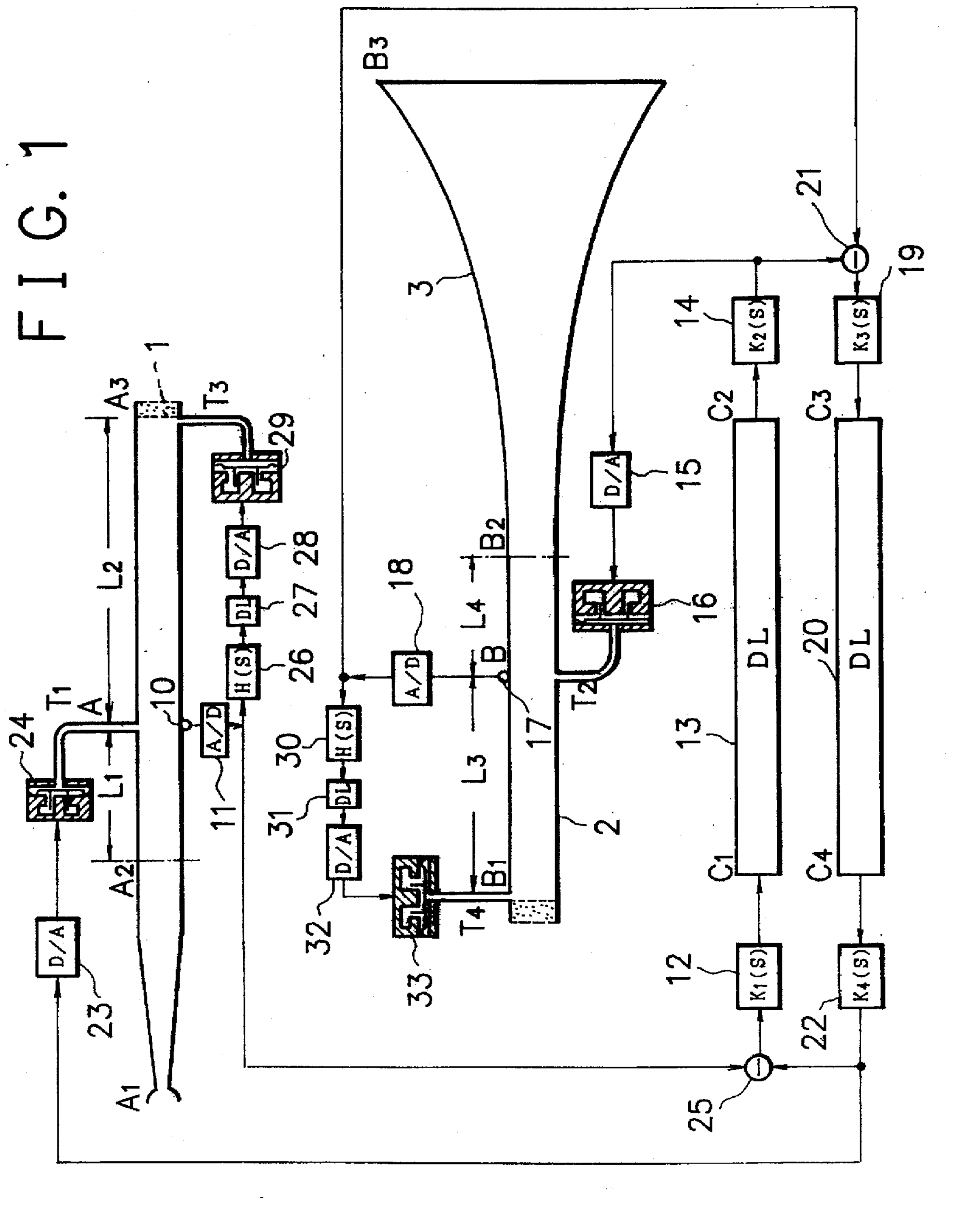
FIG. 1 is a block diagram of an electronic wind instrument which includes an electronic tubing length control apparatus according to the first embodiment of the present invention.

FIG. 1 is a block diagram showing an electronic wind instrument which includes an electronic tubing length control apparatus of this embodiment in which the present invention is applied to a brass. Note that woodwinds such as a flute, and the like may have a similar arrangement to that of this embodiment.

Referring to FIG. 1, a portion extending from a point $A_1$ to a point $A_2$ in an electronic tubing length control apparatus is a portion ($A_1$–$A_2$ portion) including a mouthpiece and a mouth pipe, and this portion is constituted by a tapered pipe. A portion extending from the point $A_2$ to a point $A_3$ is a straight pipe portion ($A_2$–$A_3$ portion) having an identical pipe diameter. This straight pipe portion is constituted by a portion ($A_2$–A portion) extending from the point $A_2$ to a point A and having a length $L_1$, and a portion (A–$A_3$ portion) extending from the point A to the point $A_3$ and having a length $L_2$. The portion with the length $L_1$ has a length to be acoustically added to the tubing length, while the portion with the length $L_2$ is arranged to form an acoustic non-reflection end at the point $A_3$.

On the other hand, a portion extending from a point $B_2$ to a point $B_3$ is a flare-bell portion ($B_2$–$B_3$ portion) of a brass, and a portion extending beside the left of the point $B_2$ from a point $B_1$ to the point $B_2$ is a straight pipe portion ($B_1$–$B_2$ portion) having the same pipe diameter as that of the $A_2$–$A_3$ portion. The straight pipe portion is constituted by a portion ($B_1$–B portion) extending from the point $B_1$ to a point B and having a length $L_3$, and a portion (B–$B_2$ portion) extending from the point B to the point $B_2$ and having a length $L_4$. The portion with the length $L_4$ has a length to be acoustically added to the tubing length, while the portion with the length $L_3$ is arranged to form an acoustic non-reflection end at the point $B_1$.

On the section at the point A, a first sensor 10 and a driving end of a first actuator 24 are arranged, and on the section at the point B, a second sensor 17 and a driving end of a second actuator 16 are arranged. The first and second sensors 10 and 17 are used for detecting the pressure (or the particle velocity) in the pipe, and are buried in the pipe wall so as not to disturb vibrations of an air column. The first and second actuators 16 and 24 drive a pipe air column via high-impedance thin pipes each having an acoustic impedance $Z_S$.

Reference numerals 13 and 20 denote electronic delay lines whose delay times (delay amounts) can be freely changed in correspondence with a note (pitch), as will be described later.

The propagation state of sound waves in the electronic wind instrument including the electronic tubing length control apparatus of this embodiment will be described below.

A pressure wave blown by a player from the point $A_1$ as the entrance of the mouthpiece causes a variation in pressure or flow rate in the mouthpiece. The variation reaches the mouthpiece end, i.e., the point $A_2$ as the entrance of the straight pipe. Note that the waveform of the sound pressure wave at the point $A_2$ is represented by $P_0(t)$ and its Laplace-transformed form is represented by $P_0(s)$.

The sound pressure wave $P_0(s)$ propagates in the $A_2$–A portion, and reaches the point A. If we have:

$$\epsilon = e^{-(s+\frac{1}{T})/c} \qquad (1)$$

a wave given by $P_0(s)\epsilon^{L1}$ is input from the mouthpiece side to the point A due to a delay time corresponding to the length $L_1$. In equation (1) above, c is the sound velocity, and T is a term associated with the loss of a pipe path. In this case, if the pipe path is considered lossless by approximation, $T\rightarrow\infty$, and therefore, $1/T\approx 0$ may be set.

The wave input to the point A travels to the right and reaches the point $A_3$. In this embodiment, since the acoustic non-reflection end is formed at the point $A_3$, no reflected wave returns from the point $A_3$. Note that the acoustic non-reflection end can be constituted by a pipe having a length large enough to be regarded as an acoustically infinite length pipe by approximation. The non-reflection end may be actively constituted, and as will be described later, for a sound pressure $P_A(s)$ at the point A, the mechanical system of an actuator 29 may be driven by:

$$P_S = Z_S/Z_A(1-Z_A/Z_C)P_A(s)\epsilon^{L2}$$

The sound wave $P_0(s)\epsilon^{L1}$ input to the point A is converted into an electrical signal by the first sensor 10 buried in the inner wall of the pipe body on the same section with the point A. This electrical signal is converted into a digital signal by an A/D converter 11, and the digital signal is input to an input point $C_1$ of the first electronic delay line 13 via a buffer filter circuit 12 having a transfer function $K_1(s)$.

If the delay length of the first electronic delay line 13 is represented by d, the output signal from the first electronic delay line 13 is output from an output point $C_2$ as an electrical signal $K_1(s)P_0(s)\epsilon^{L1+d}$.

This output is supplied to the second actuator 16 via a buffer filter circuit 14 having a transfer function $K_2(s)$ and a D/A converter 15 to drive the actuator 16.

A wave which is generated by the second actuator 16 at the point B in the straight pipe, and propagates to both the sides from the point B will be described below with reference to FIGS. 2A to 2C. Note that the force which acts on a diaphragm of the second actuator 16 upon application of a driving voltage is represented by $P_S$ as a sound pressure.

Figure 2A:
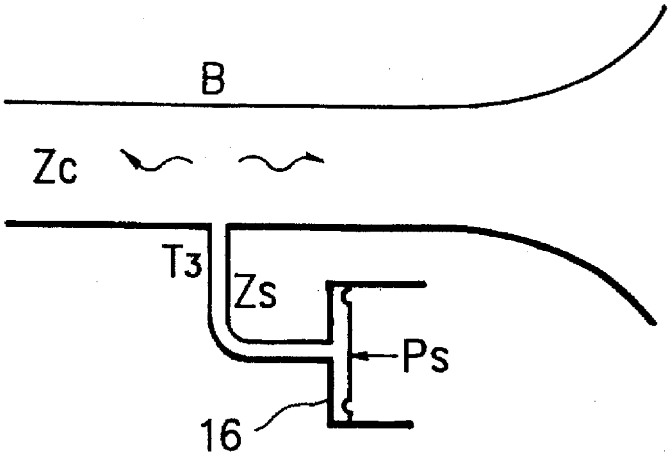
FIG. 2A is a schematic view of an acoustic system for explaining the driving operation of an actuator for converting an output signal from electronic delay lines into a sound pressure signal.
Figure 2B:
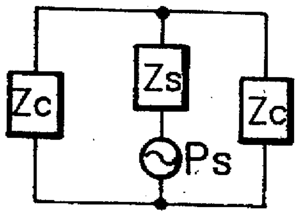
FIGS. 2B and 2C are diagrams showing equivalent circuits of FIG. 2A.

FIG. 2A shows a state wherein the output from the second actuator 16 is supplied to the straight pipe of the electronic tubing length control apparatus via a thin impedance pipe $T_2$ having an acoustic impedance $Z_S$. FIG. 2B shows an equivalent circuit with respect to a free-traveling wave when the characteristic acoustic impedance function of the straight pipe portion of the electronic tubing length control apparatus is represented by $Z_C(s)$. FIG. 2C shows an equivalent circuit obtained by further simplifying the circuit shown in FIG. 2B.

Figure 2C:
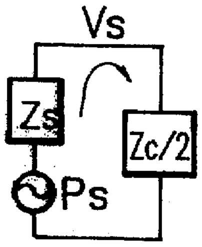

As can be seen from the equivalent circuit shown in FIG. 2C, a volume velocity given by the following equation is generated at the point B:

$$V_S = P_S/(Z_S + Z_C/2)$$

The sound pressure generated based on this volume velocity is given by:

$$P_S' = [P_S/(Z_S + Z_C/2)] \cdot Z_C/2$$

However, when the acoustic impedance $Z_S$ of an impedance pipe $T_3$ is set to be sufficiently larger than the characteristic acoustic impedance $Z_C$ of the straight pipe ($Z_S \rightarrow Z_C$), $P_S'$ is rewritten as:

$$P_S' = \tfrac{1}{2} \cdot (Z_C/Z_S) \cdot P_S$$

Since $P_S$ is proportional to the driving voltage of the second actuator 16, if the constant of proportionality is represented by $\alpha$, a sound pressure given by the following equation is generated at the point B:

$$P_S' = \tfrac{1}{2} \cdot (Z_C/Z_S) \cdot \alpha \cdot K_1(s)K_2(s)P_0(s)\epsilon^{L1+d}$$

Therefore, by adjusting the transfer functions $K_1(s)$ and $K_2(s)$ of the buffer filter circuits 12 and 14 to satisfy:

$$K_1(s)K_2(s) = (2/\alpha)\ (Z_S/Z_C)$$

a state wherein the sound pressure wave $P_0(s)\epsilon^{L1+d}$ propagates to both sides from the point B can be established. Note that the constant $\alpha$ of proportionality is a value determined by the specifications of the actuator.

This sound pressure wave propagates in the directions of the points $B_1$ and $B_2$. In this embodiment, since the acoustic non-reflection end is formed at the point $B_1$, as will be described later, the wave traveling in the direction of the point $B_1$ does not return to the point B again.

On the other hand, the wave propagating from the point B in the direction of the point $B_2$ propagates in a flare-bell 3, and produces a sound at the opening end. The wave reflected by the flare-bell 3 returns to the point B again. The wave $P_0(s)\epsilon^{L1+d}$ generated at the point B propagates in the $B$–$B_2$ portion of the straight pipe, and is expressed as $P_0(s)\epsilon^{L1+d+L4}$ at the point $B_2$. If the input impedance function of the $B_2$–$B_3$ portion of the flare-bell 3 portion is represented by $Z_H(s)$, the reflection coefficient in the $B_2$–$B_3$ portion is given by:

$$m_H(s)=(Z_H(s)-Z_C)/(Z_H(s)+Z_C)$$

Therefore, a sound pressure wave given by $m_H(s)P_0(s)\epsilon^{L1+d+L4}$ is generated at the point $B_2$, and in consideration of a delay time between the points B and $B_2$, the wave returning from the side of the flare-bell is expressed as $m_H(s)P_0(s)\epsilon^{L1+d+2L4}$ at the point B.

Therefore, the second sensor 17 arranged on the inner wall of the pipe wall at the point B detects a voltage proportional to:

$$P_0(s)\epsilon^{L1+d}+m_H(s)P_0(s)\epsilon^{L1+d+2L4}$$

The output signal from the second sensor 17 is converted into a digital signal by an A/D converter 18, and the digital signal is supplied to an input point $C_3$ of the second electronic delay line 20 via a buffer filter circuit 19 having a transfer function $K_3(s)$. However, in an actual physical system, a reflected wave returning from the side of the flare-bell toward the mouthpiece side is only $m_H(s)P_0(s)\epsilon^{L1+d+2L4}$ as the second term of the voltage detected by the second sensor 17, and $P_0(s)\epsilon^{L1+d}$ as the first term must not return to the mouthpiece side as the reflected wave. Thus, in this embodiment, a subtracter 21 is arranged to subtract the output voltage from the first electronic delay line 13 from the voltage detected by the second sensor 17. For this reason, a voltage $m_H(s)P_0(s)\epsilon^{L1+d+2L4}$ is finally supplied to the input point $C_3$ of the second electronic delay line 20.

If the delay length of the second electronic delay line 20 is represented by d, the output signal from the second electronic delay line 20 is output from an output point $C_4$ as an electrical signal $K_3(s)m_H(s)P_0(s)\epsilon^{L1+2(L4+d)}$.

This output is converted into an analog signal by a D/A converter 23 via a buffer filter circuit 22 having a transfer function $K_4(s)$, and the analog signal is supplied to the first actuator 24 as a driving voltage $K_3(s)K_4(s)m_H(s)P_0(s)\epsilon^{L1+2(L4+d)}$ to drive the actuator.

If the output from the first actuator 24 is supplied to a first straight pipe 1 of the electronic tubing length control apparatus via a thin impedance pipe $T_1$ having an acoustic impedance $Z_S$ which satisfies $Z_S \rightarrow Z_C$ in the same manner as described above, the pressure of a wave which is generated by the first actuator 24 at the point A in the first straight pipe 1 and propagates to both the sides is given by:

$$P_S''=\tfrac{1}{2}\cdot(Z_C/Z_S)\cdot\alpha\cdot K_3(s)K_4(s)m_H(s)P_0(s)\epsilon^{:1+2(L4+d)}$$

Therefore, by adjusting the transfer functions $K_3(s)$ and $K_4(s)$ of the buffer filter circuits 19 and 22 to satisfy:

$$K_3(s)K_4(s)=(2/\alpha)\,(Z_S/Z_C)$$

a sound pressure wave $m_H(s)P_0(s)\epsilon^{L1+2(L4+d)}$ returns to the point A.

This sound pressure wave propagates in the directions of the points $A_2$ and $A_3$. In this embodiment, as described above, since the acoustic non-reflection end is formed at the point $A_3$, the wave traveling in the direction of the point $A_3$ does not return to the point A again. However, when the first sensor 10 detects this wave and enables a route for driving the first electronic delay line 13 again, the generated waves become different from those generated in an actual physical system. In order to prevent this, in this embodiment, a subtracter 25 is arranged in the same manner as described above to subtract the signal returning to the first actuator 24 from the signal detected by the first sensor 10.

On the other hand, the wave propagating from the point A in the direction of the point $A_2$ is reflected at the point $A_2$ as a joint end between the mouthpiece and the mouth pipe, and returns to the point A again. If the acoustic impedance function of a portion on the mouthpiece side of the point $A_2$ is represented by $Z_M(s)$, the reflection coefficient at the point $A_2$ is expressed as:

$$m_M(s)=(Z_M-Z_C)/(Z_M+Z_C)$$

Therefore, in consideration of a delay time due to the route of the wave, a sound pressure wave $m_H(s)m_M(s)P_0(s)\epsilon^{3L1+2(L4+d)}$ returns from the mouthpiece-mouth pipe side to the point A.

As described above, in the electronic tubing length control apparatus, since propagation and reflection of waves are successively repeated, the sound pressure wave propagating from the mouthpiece-mouth pipe side to the point A is given by:

$$P_1(s)=P_0(s)\epsilon^{L1}[1+m_H m_M\epsilon^{2(L1+L4+d)}+m^2{}_H m^2{}_M\epsilon^{4(L1+L4+d)}+\ldots]$$

On the contrary, a sound pressure wave which propagates from the side of the flare-bell to the point A is given by:

$$P_2(s)=P_0(s)\epsilon^{L1}m_H\epsilon^{2(L4+d)}[1+m_H m_M\epsilon^{2(L1+L4+d)}+m^2{}_H m^2{}_M\epsilon^{4(L1+L4+d)}+\ldots]$$

If L as the length (total straight pipe length) of the effective straight pipe portion of an acoustic musical instrument is given by $L=L_1+L_4+d$, the sound pressure at the point A is given by the following equation (2):

$$P_A(s)=P_0(s)\epsilon^{L1}[1+\overrightarrow{m_M}\epsilon^{2L}+m_M{}^2\epsilon^{4L}+\ldots]+P_0(s)\epsilon^{2L-L1}[1+\overleftarrow{m_M}\epsilon^{2L}+m_M{}^2\epsilon^{4L}+\ldots] \quad (2)$$

Figure 3:
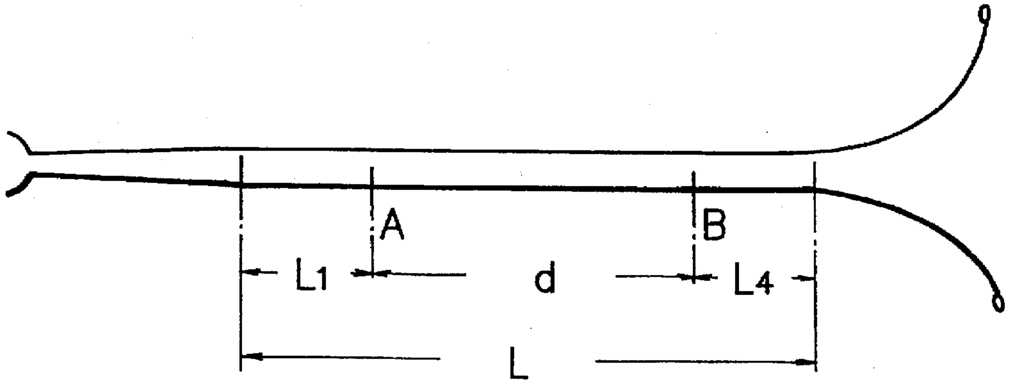
FIG. 3 is a schematic view for explaining the total straight tubing length of a wind instrument.

Equation (2) expresses the Laplace-transformed form of a sound pressure at one point A of the straight pipe portion having the length L inserted between the mouthpiece & mouth pipe portion and the flare-bell 3 portion if a brass is taken as an example, as shown in FIG. 3. A portion having the partial length d of the total straight pipe length L is replaced by the electronic delay lines, as described above, and by arbitrarily changing the delay times of the delay lines, the pitch of a musical tone produced by the wind instrument can be desirably controlled.

The acoustic non-reflection ends arranged at the points $A_3$ and $B_1$ in this embodiment will be explained below. If pipes which have the same diameter as that of the straight pipe and an infinite length are arranged at the points $A_3$ and $B_1$, since no sound waves reflected at these points return, the points $A_3$ and $B_1$ can be acoustic non-reflection ends. However, in practice, even when a pipe having an infinite length is not used, reflection in a required frequency band can be suppressed using a pipe having a length large enough to be regarded as an infinite length pipe by approximation or using an appropriate absorption material at the points $A_3$ and $B_1$.

On the other hand, acoustic non-reflection ends can be formed at the points $A_3$ and $B_1$ using active means. This will be explained below.

The sound pressure $P_A(s)$ at the point A is given by equation (2) above, and a sound pressure P(s,x) and a volume velocity $V_S(s,x)$ at a point separated by a distance x from the point A toward the point $A_3$ are expressed as follows:

$$P(s,x) = a\epsilon^{x} + b\epsilon^{-x} \tag{3}$$

$$V_S(s,x) = \frac{a}{Z_C}\epsilon^{x} - \frac{b}{Z_C}\epsilon^{-x} \tag{4}$$

where a and b are respectively the amplitudes of a free-traveling wave and a reflected wave of the sound pressure waveform.

Figure 4A:
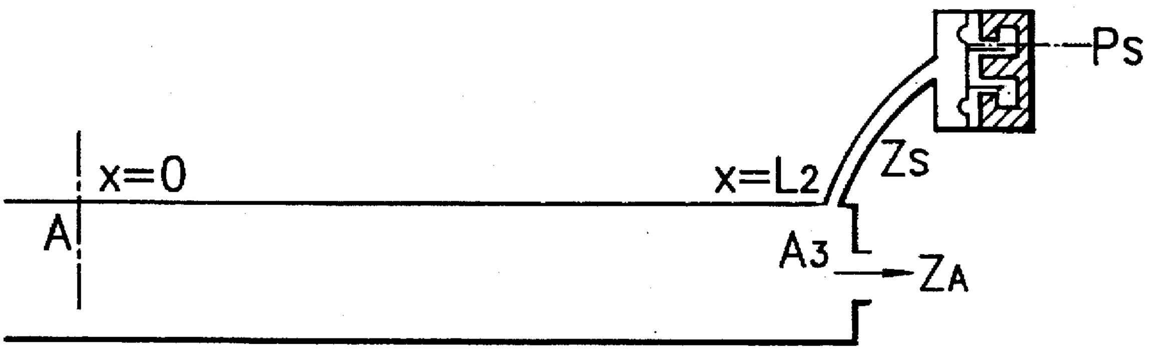
FIG. 4A is a schematic view for explaining the driving operation of an actuator at an acoustic non-reflection end.
Figure 4B:
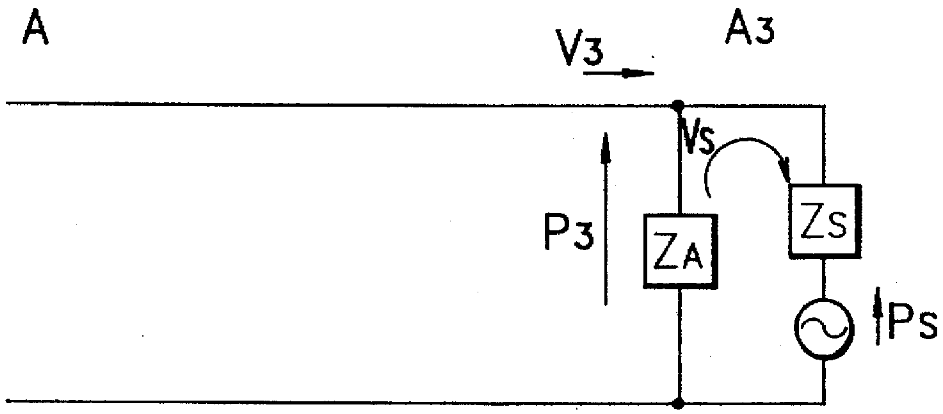
FIG. 4B is a diagram showing an equivalent circuit of FIG. 4A.

FIG. 4A shows a state wherein a secondary sound source is given from the actuator to the straight pipe via an impedance pipe having an impedance $Z_S$ by an acoustic driving force $P_S$. FIG. 4B shows an equivalent circuit of FIG. 4A. From FIG. 4B, a sound pressure $P_3$ and a volume velocity $V_3$ at the point $A_3$, a volume velocity $V_S$ given from the secondary sound source, and an acoustic impedance $Z_A$ at the pipe end satisfy the following relationship:

$$P_3 = P_S + Z_S V_S = Z_A(V_3 - V_S)$$

Therefore, the volume velocity $V_S$ is given by:

$$V_S = (Z_A V_3 - P_S)/(Z_A + Z_S)$$

and the following equation (5) is established:

$$P_3 = \frac{(P_S + V_3 Z_S)Z_A}{Z_A + Z_S} \tag{5}$$

In this embodiment, since $Z_S \gg Z_A$, i.e., the actuator is driven via the impedance pipe $T_3$ having a sufficiently large impedance $Z_S$, we have:

$$P_3 \approx P_S \cdot (Z_A/Z_S) + V_3 Z_A$$

Therefore, from the following boundary conditions:

$P(s,0) = P_A(s)$ when x=0

$P(s,L_2) = P_3 = P_S \cdot (Z_A/Z_S) + V_3 Z_A$ when $x = L_2$ the following equations are established:

$$P_A(s) = a + b$$

and $$P_S\frac{Z_A}{Z_S} + \frac{Z_A}{Z_C}(a\epsilon^{L2} - b\epsilon^{-L2}) = (a\epsilon^{L2} + b\epsilon^{-L2}) \tag{6}$$

From these two equations, the amplitude b(s) of the reflected wave is given by:

$$b(s) = \frac{P_S\frac{Z_A}{Z_S} - \left(1 - \frac{Z_A}{Z_C}\right)\epsilon^{L2}P_A(s)}{\left(1 + \frac{Z_A}{Z_C}\right)\epsilon^{-L2} - \left(1 - \frac{Z_A}{Z_C}\right)\epsilon^{L2}} \tag{7}$$

Therefore, from a non-reflection condition b=0, the following equation (8) is established:

$$P_S(s) = \frac{Z_S}{Z_A}\left(1 - \frac{Z_A}{Z_C}\right)\epsilon^{L2}P_A(s) \tag{8}$$

Therefore, if the actuator is driven by $P_S$ given by equation (8) as a sound pressure, reflected waves are removed since they cancel each other, and a non-reflection end is formed at the point $A_3$. More specifically, a signal proportional to the sound pressure $P_A(s)$ detected by the first sensor 10, arranged at the point A, is converted into a digital signal by the A/D converter 11, and the digital signal, which is delayed by a third electronic delay line 27 equivalently having a delay length $L_2$ via a digital filter circuit 26 having a transfer function H(s) given by the following equation, is converted into an analog signal by a D/A converter 28 to drive a third actuator 29, thus forming an acoustic non-reflection end at the point $A_3$:

$$H(s) = (Z_S/Z_A)(1 - Z_A/Z_C)$$

On the other hand, when $Z_A \gg Z_S$, for example, when the terminal end of the point $A_3$ is a closed pipe, from equation (5), we have:

$$P_3 = (P_S + V_3 Z_S)Z_A/Z_A = P_s + V_3 Z_S$$

Therefore, based on boundary conditions of $P(s,0) = P_A(S)$ when x=0 and $P(s,L_2) = P_3 = P_S + P_3 Z_S$ when $x = L_2$, the following two equations are established from equations (3) and (4):

$$P_A(s) = a + b$$

and $$P_S + \frac{Z_S}{Z_C}(a\epsilon^{L2} - b\epsilon^{-L2}) = a\epsilon^{L2} + b\epsilon^{-L2} \tag{9}$$

From these two equations, the amplitude b(s) of the reflected wave is given by:

$$b(s) = \frac{P_S - \left(1 - \frac{Z_S}{Z_C}\right)\epsilon^{L2}P_A}{\left(1 + \frac{Z_S}{Z_C}\right)\epsilon^{-L2} - \left(1 - \frac{Z_S}{Z_C}\right)\epsilon^{L2}} \tag{10}$$

Therefore, from a non-reflection condition b(s)=0, the following equation (11) is established:

$$P_S(s) = \left(1 - \frac{Z_S}{Z_C}\right)P_A(s)\epsilon^{L2} \tag{11}$$

Therefore, if the third actuator 29 is driven by $P_S$ given by equation (11) as a sound pressure, reflected waves are removed since they cancel each other, and a non-reflection end is formed at the point $A_3$. More specifically, a signal proportional to the sound pressure $P_A(s)$ detected by the first sensor 10, arranged at the point A, is converted into a digital signal by the A/D converter 11, and the digital signal, which is delayed by the third electronic delay line 27 equivalently having a delay length $L_2$ via the digital filter circuit 26 having a transfer function $H(s) = (1 - Z_S/Z_C)$, is converted into an analog signal by the D/A converter 28 to drive the third actuator 29, thus forming an acoustic non-reflection end at the point $A_3$.

In this embodiment, each of the first, second, and third actuators 24, 16, and 29 is constituted by attaching, to the distal end side of a diaphragm, a thin pipe which is formed to have a small diameter to generate a sound pressure via an impedance pipe having an impedance $Z_S$ sufficiently higher than the characteristic acoustic impedance $Z_C$ of the straight pipe portion of the instrument main body, and is packed with an appropriate resistance material as needed.

It is preferable that the acoustic non-reflection end generates no sound to an external portion in practice. Therefore, the acoustic non-reflection end must be designed to pass a sound wave through a large resistance component, to reduce the radiation efficiency of a sound from this end by constricting the pipe, or to be a closed end.

Furthermore, in order to eliminate reflection from the acoustic non-reflection end $A_3$, the digital filter circuit 26 having the above-mentioned transfer function:

$$H(s)=(Z_S/Z_A)\,(1-Z_Z/Z_C)$$

or $$H(s)=(1-Z_S/Z_C)$$

is used in correspondence with the relationship between the radiation acoustic impedance $Z_A$ at that end and the acoustic impedance $Z_S$ of the impedance pipe. However, the transfer function of the digital filter circuit 26 must be finely adjusted due to a change in sound velocity, a change in dimensions, or the like due to a change in temperature. Therefore, on a performance, it is preferable that the transfer function H(s) of the digital filter circuit 26 and the characteristics of the third electronic delay line 27 are adjusted, such that a short pulse-shaped waveform is blown in advance from the mouthpiece end $A_1$, and a reflected pulse having passed the point A, reflected at the point $A_3$, and then returned to the point A becomes almost zero.

The means for forming the acoustic non-reflection end at the point $A_3$ has been described. An acoustic non-reflection end can also be formed at the point $B_1$ by the same arrangement as described above. In this case, a signal detected by the second sensor 17 is input to a digital filter circuit 30 having the above-mentioned transfer function $H(s)=(Z_S/Z_A)(1-Z_A/Z_C)$ or $H(s)=(1-Z_S/Z_C)$, and a signal delayed by a fourth electronic delay line 31 equivalently having a delay length $L_3$ is converted into an analog signal by a D/A converter 32 to drive a fourth actuator 33. Note that the acoustic non-reflection ends at the points $A_3$ and $B_1$ need not always be active means, but infinite length pipes having the same diameter as that of the straight pipe portion may be connected. In practice, in place of the infinite length pipes, a straight pipe having a sufficient length may be gently wound a large number of turns in a spiral shape.

A mechanism for changing the tubing length of the straight pipe portion of the electronic tubing length control apparatus will be explained below. For example, the tubing length of a trumpet can be changed in seven stages by operating a valve system. On the other hand, the tubing length of a trombone continuously changes, but normally has seven slide positions. Therefore, for these musical instruments, the delay times of the above-mentioned electronic delay lines must be changed in seven stages at half-note intervals. However, when the pitch continuously changes with a predetermined width by operating, e.g., a trigger, the delay times must be finely adjusted. For example, in a trumpet, a function of finely adjusting the delay times on the basis of a resistance or voltage value which changes in synchronism with the movement of a third valve slide with a trigger, as will be described later is required.

Figure 5:
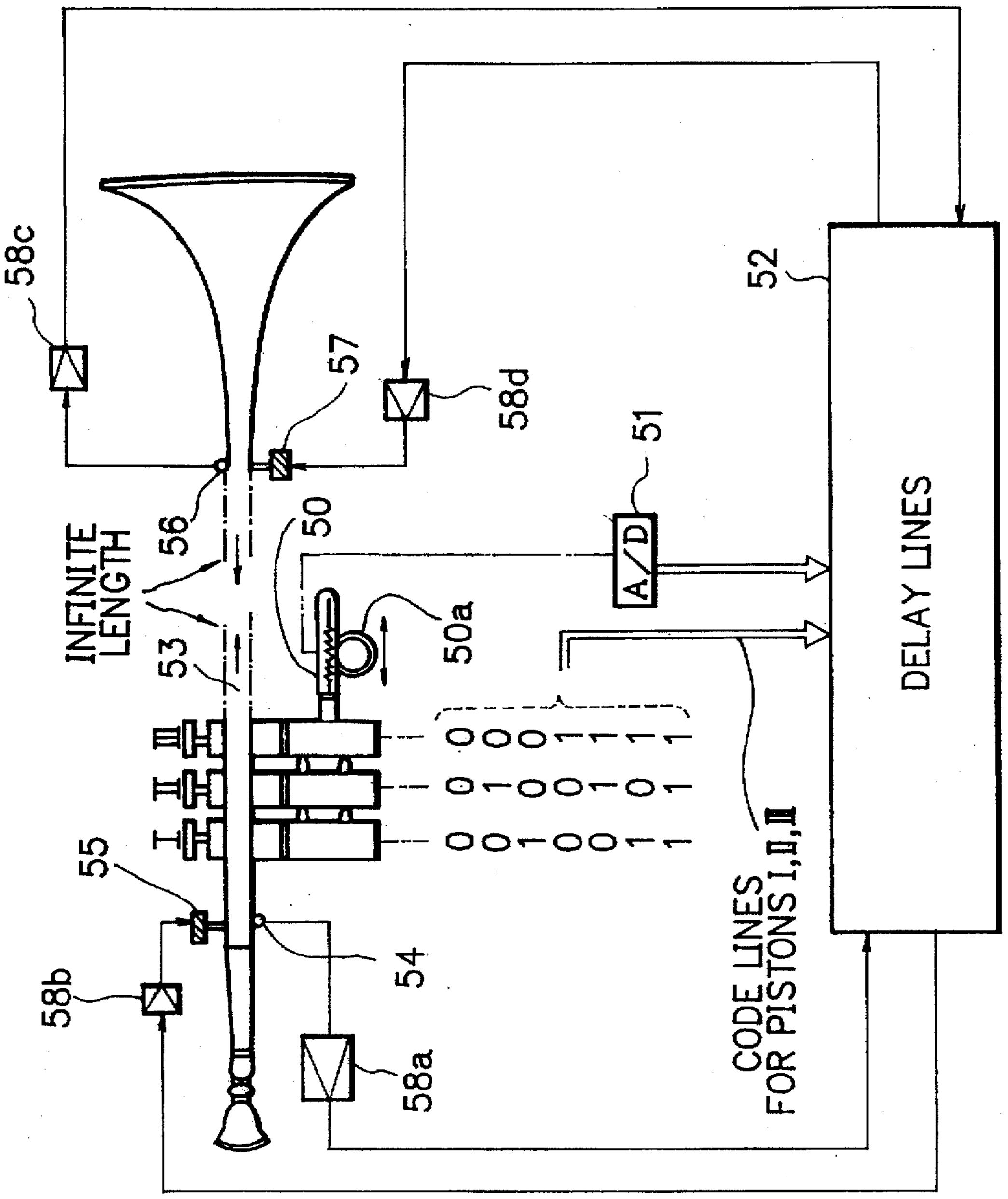
FIG. 5 is a block diagram showing an electronic tubing length control apparatus using scale codes generated in correspondence with the ON/OFF states of pistons of a trumpet.

FIG. 5 shows a trumpet according to an embodiment of the present invention, which structurally comprises switches for detecting the ON/OFF states of three pistons I, II, and III in a valve system. This trumpet uses a valve system, a slide pipe, and a key mechanism, which are arranged to have the same shape and the same interval as those of an acoustic trumpet, and make the same motions. An operation during a performance is detected in the form of a binary code, and the binary code is input to the above-mentioned electronic delay line as a scale control code, thus generating a delaying coefficient.

More specifically, as shown in FIG. 5, the operation states of the three pistons I, II, and III are expressed by codes representing ON/OFF states, and a 3-bit binary code is supplied to delay lines 52. On the other hand, a continuous change in position of a trigger **50*a* is detected by a detector 50. The detector 50 shown in FIG. 5 detects the operation state of the trigger 50*a* as an analog amount. Thus, as shown in FIG. 5, the detection output from the detector 50 is converted into a digital signal by an A/D converter 51, and the digital signal is supplied to the delay lines 52**.

On a straight pipe 53, a first sensor 54 and a first actuator 55 are arranged at a first predetermined position set near the mouthpiece side, and a second sensor 56 and a second actuator 57 are arranged at a second predetermined position set near the side of the flare-bell.

Furthermore, buffer amplifiers **58*a* and 58*c* are arranged between the delay lines 52 and the first and second sensors 54 and 56, so that the sensor outputs are amplified to a predetermined level, and thereafter, are supplied to the delay lines 52**.

Buffer amplifiers **58*b* and 58*d* are arranged between the delay lines 52 and the first and second actuators 55 and 57, so that signals output from the delay lines 52** are amplified, and thereafter, are supplied to the corresponding actuators.

In the trumpet of this embodiment with the above-mentioned arrangement, if a depression (switch on) of a piston corresponds to a code "1", and an up state (switch off) of the piston corresponds to a code "0", the depressed pistons, switch operations, and extension of the tubing length have a relationship thereamong shown in Table 1 below.

TABLE 1

| Depressed Piston No. | Switch Operation (Switch Code) | Extension of Tubing Length (Delaying) |
|---|---|---|
| None | 0 0 0 | 0 |
| II | 0 1 0 | One Half Note |
| I | 1 0 0 | Two Halves |
| III | 0 0 1 | Three Halves |
| II III | 0 1 1 | Four Halves |
| I III | 1 0 1 | Five Halves |
| I II III | 1 1 1 | Six Halves |

Therefore, when a switch code shown in Table 1 above is input to a delaying coefficient generator shown in FIG. 6 (to be described later) as a scale control code input, the tubing length of the straight pipe portion can be controlled. The same method applies to musical instruments other than the trumpet.

A tubing length controller for controlling the length of the straight pipe portion in this embodiment will be described below.

Figure 6:
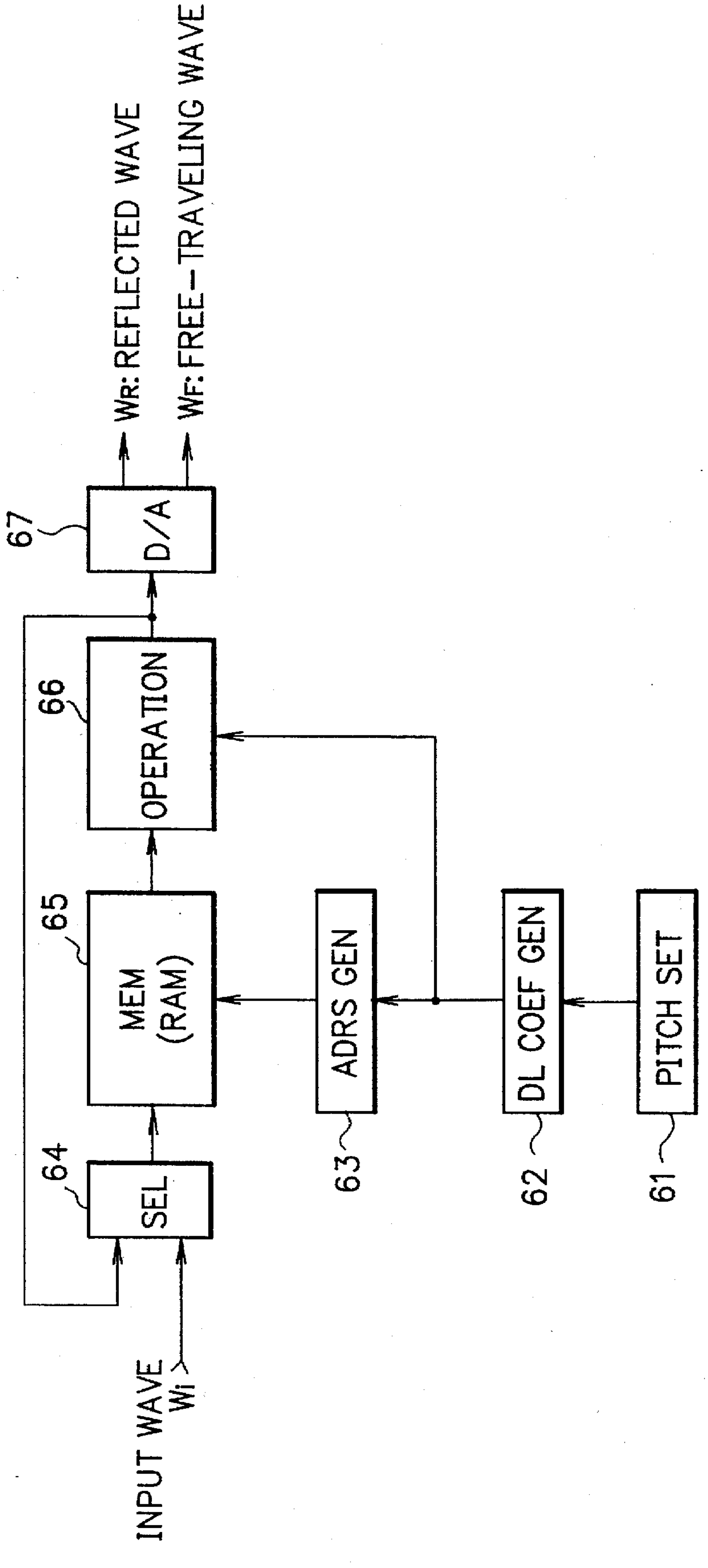
FIG. 6 is a block diagram showing an embodiment of a tubing length controller.

FIG. 6 is a block diagram showing an example of the tubing length controller. The tubing length controller comprises a pitch setting unit 61, a delaying coefficient generator 62, an address generator 63, a selector 64, a memory 65, an operation unit 66, and a D/A converter 67. The pitch setting unit 61 is normally constituted by switches corresponding to valves, as shown in FIG. 5, but may comprise a keyboard. Furthermore, the pitch setting unit 61 comprises a tubing length fine control means such as a volume, a rotary encoder, which directly outputs a digital value, or the like.

In the tubing length controller with the above-mentioned arrangement, switch information indicating a scale and fine control information output from the pitch setting unit 61 are supplied to the delaying coefficient generator 62 as a scale control code and a fine control code.

Figure 7:
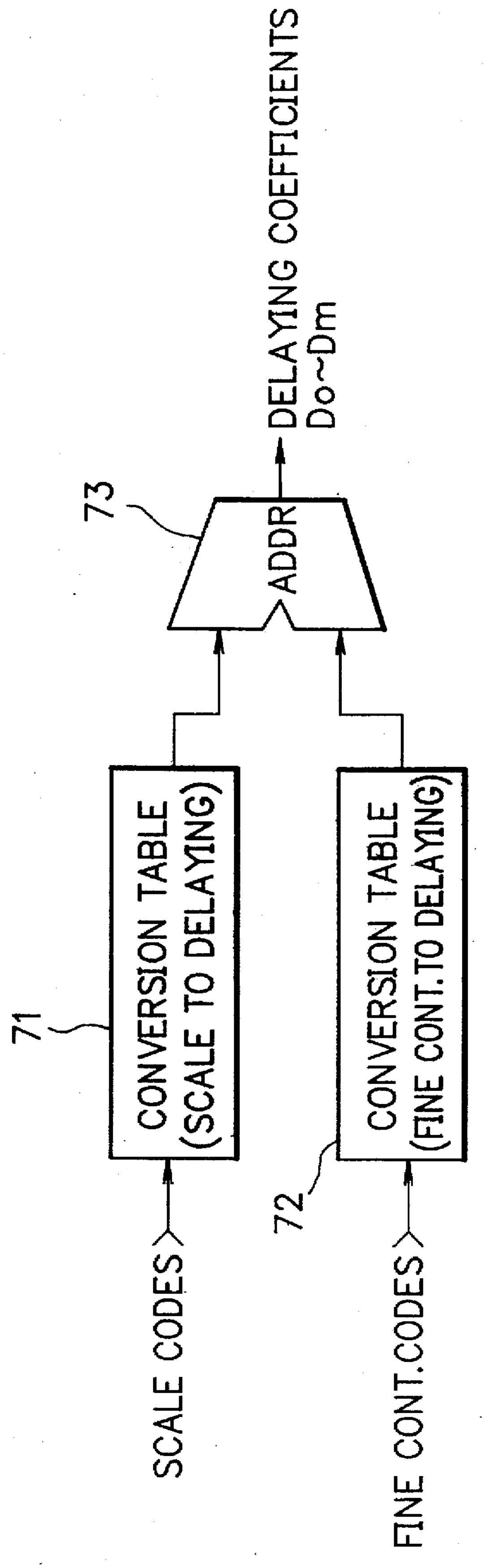
FIG. 7 is a block diagram showing an embodiment of a delay coefficient generator.

FIG. 7 is a block diagram showing an embodiment of the delaying coefficient generator 62. The scale control code input to the delaying coefficient generator 62 is converted into a scale delaying coefficient corresponding to a delay time (a propagation delay time of a sound wave) for obtaining a desired scale by a scale-to-delaying conversion table 71 (comprising, e.g., a ROM). Furthermore, the fine control code is also converted into a fine control delaying coefficient by a fine control-to-delaying conversion table 72. These coefficients are added to each other by an adder 73.

For the sake of simplicity, the frequency of system clocks in this embodiment is assumed to be 800 kHz. Because, if an operation is made using a delay time (to be described later) of 10 μs (corresponding to 100 kHz), the system delay amount can be easily recognized. If the tubing length is prolonged by 34 cm, since the sound velocity c is 340 m/s at a temperature of 15° C., a delay time $T_D$ required for the sound wave to propagate by 34 cm is 34÷34,000=0.001 sec=1 ms. Since the delay time resolution of the system is 10 μs described above, it is axiomatic that the delay time becomes equal to the delay amount if the delaying coefficient is set to be 100.

It is apparent from a scale frequency table that the scale has an indivisible value. Furthermore, it is also understood that a resolution of 10 μs is insufficient. The resolution must be determined based on pitch control precision, and hence, the delaying coefficient inevitably has a value including a fractional part.

The fine control-to-delaying conversion table 71 is also determined by the frequency precision and the frequency range to be controlled. These are problems associated with the specifications of the system. Since the control is realized using a conversion table as in this embodiment, the fine control curve can be altered and allocation of control frequencies can be freely changed (like pistons of the wind instrument). Furthermore, conversion tables can be prepared in units of types of musical instruments, and can be selected in correspondence with each musical instrument type. In this embodiment, the scale-to-delaying conversion table 71 and the fine control-to-delaying conversion table 72 are independently arranged. However, if these tables are combined to be a single table, and the table is arranged as a ROM, data can be easily time-divisionally read out.

Figure 8:
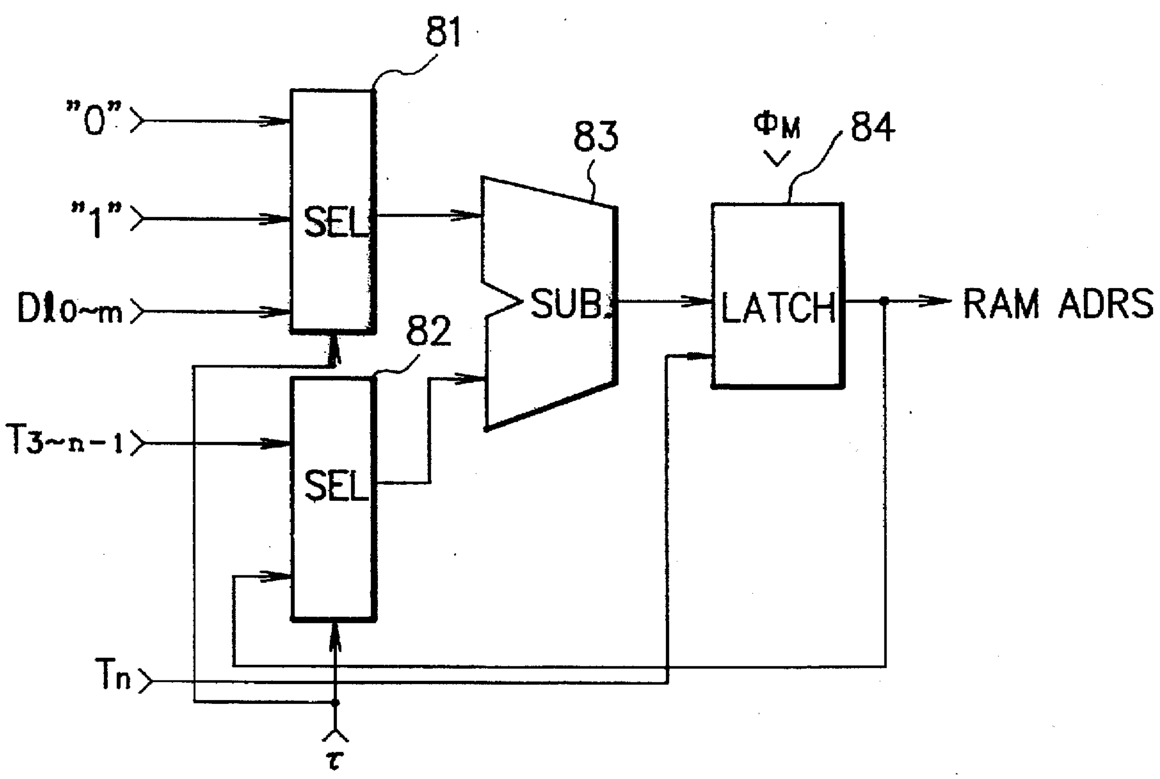
FIG. 8 is a block diagram showing an embodiment of an address generator.

The integral part of a delaying coefficient from the delaying coefficient generator 62 is input to the address generator 63. In this embodiment, a delay circuit is realized using a RAM, but may be realized by another circuit arrangement using shift registers, as a matter of course. FIG. 8 shows an embodiment of the address generator 63 in this embodiment, and FIGS. 10A to 10I show the operation timings of the address generator 63. An explanation of the timings will be given with reference to FIGS. 10A to 10I. The timings in this embodiment are determined based on eight timing signals $\tau_0$ to $\tau_7$.

Referring to FIG. 8, a first selector 81 sequentially selects one of values "0" and "1" and integral parts $D_{L0}$ to $D_{Lm}$ of the delaying coefficients in accordance with the timing signal τ. A second selector 82 sequentially selects a latch output and count values $T_3$ to $T_{n-1}$ in accordance with the timing signal τ. At the first timing $\tau_0$, the selector 81 selects delaying coefficients $D_{L0}$ to $D_{Lm}$, a subtracter 83 subtracts the selected delaying coefficients from upper count values $T_3$ to $T_{n-1}$ of a counter, and the subtraction result is latched by a latch circuit 84. Therefore, $[T-D_L]$ is supplied as a RAM address at the second timing $\tau_1$ (see FIGS. 10A to 10I).

Furthermore, at the second timing $\tau_1$, the second selector 82 selects the latch output, and the first selector 81 selects "1", thus calculating a delay time $[T-D_L-1]$ larger by one clock. The operation result is latch-output at the third timing $\tau_2$. At the third timing $\tau_2$, the first selector 81 selects "0" and the second selector 82 selects the count values $T_3$ to $T_{n-1}$ again. Then, addresses $T_3$ to $T_{n-1}$ indicated by a pointer are calculated, and are output as RAM addresses at the fourth timing $\tau_3$.

The same operations as described above are performed at the subsequent timings $\tau_4$, $\tau_5$, and $\tau_6$, and operation results are latch-output at the timings $\tau_5$, $\tau_6$, and $\tau_7$. When an address $T_n$ is latched, a free-traveling wave area (MSB="LOW") and a reflected wave area (MSB="HIGH") are respectively output. This means that the first half area of the RAM area is used as a free-traveling wave storage area, and the second half area is used as a reflected wave storage area. Note that the subtracter 83 can be constituted by an adder, and can also serve as the above-mentioned delaying coefficient operation means since it is not busy at timings $\tau_3$ to $\tau_7$.

The memory 65 shown in FIG. 6 will be described below. The memory 65 is addressed at the timings shown in FIG. 10F. In the memory 65, an input wave $W_i$ is written at the fourth timing $\tau_3$ via the selector 64 in FIG. 6, and $W_R$ (the output from the operation unit; to be described later) is written at the eighth timing $\tau_7$ via the selector 64.

Figure 9:
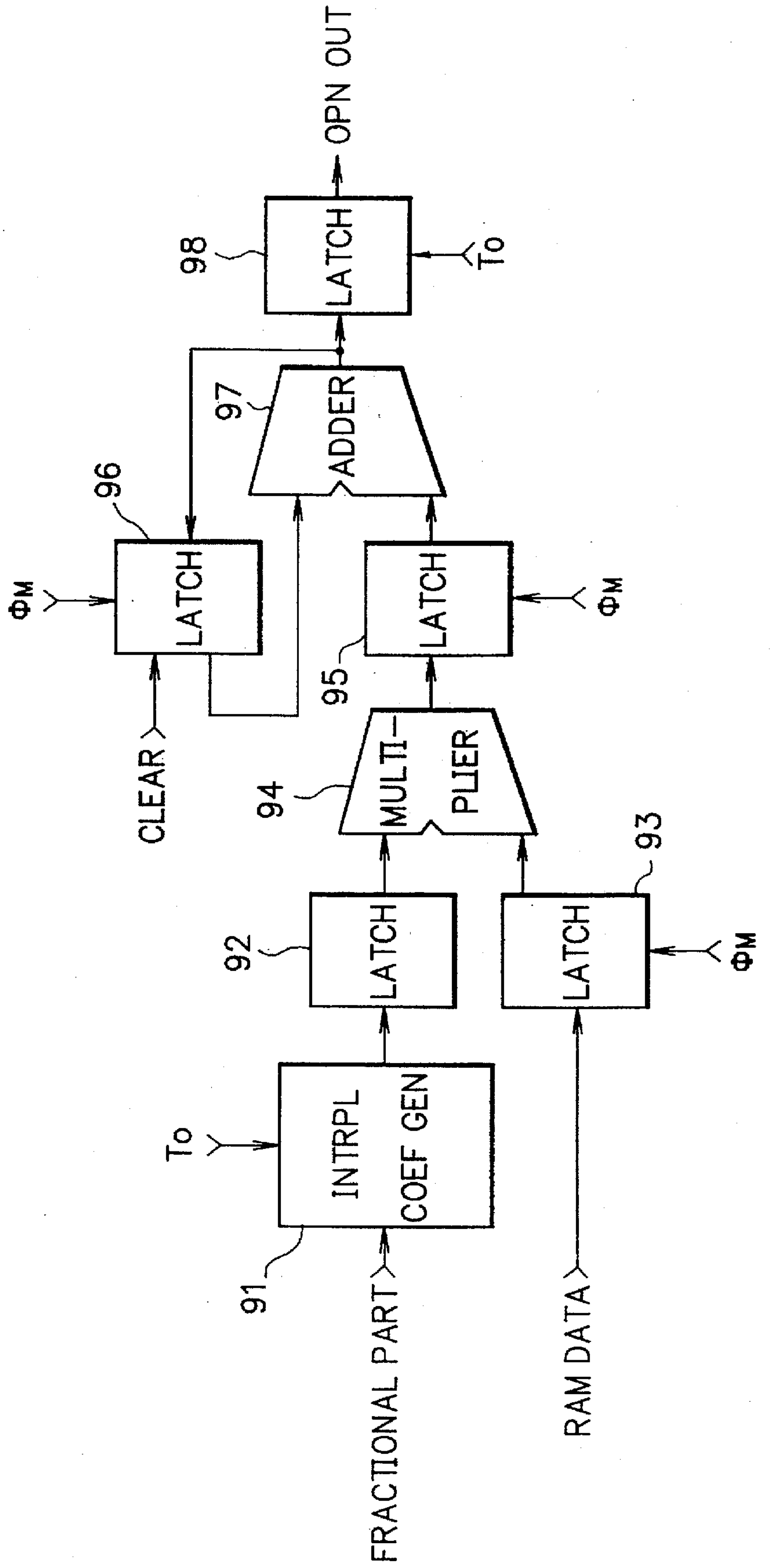
FIG. 9 is a block diagram showing an embodiment of an operation circuit.
Figures 10A, 10B, 10C, 10D, 10E, 10F, 10G, 10H, 10I:
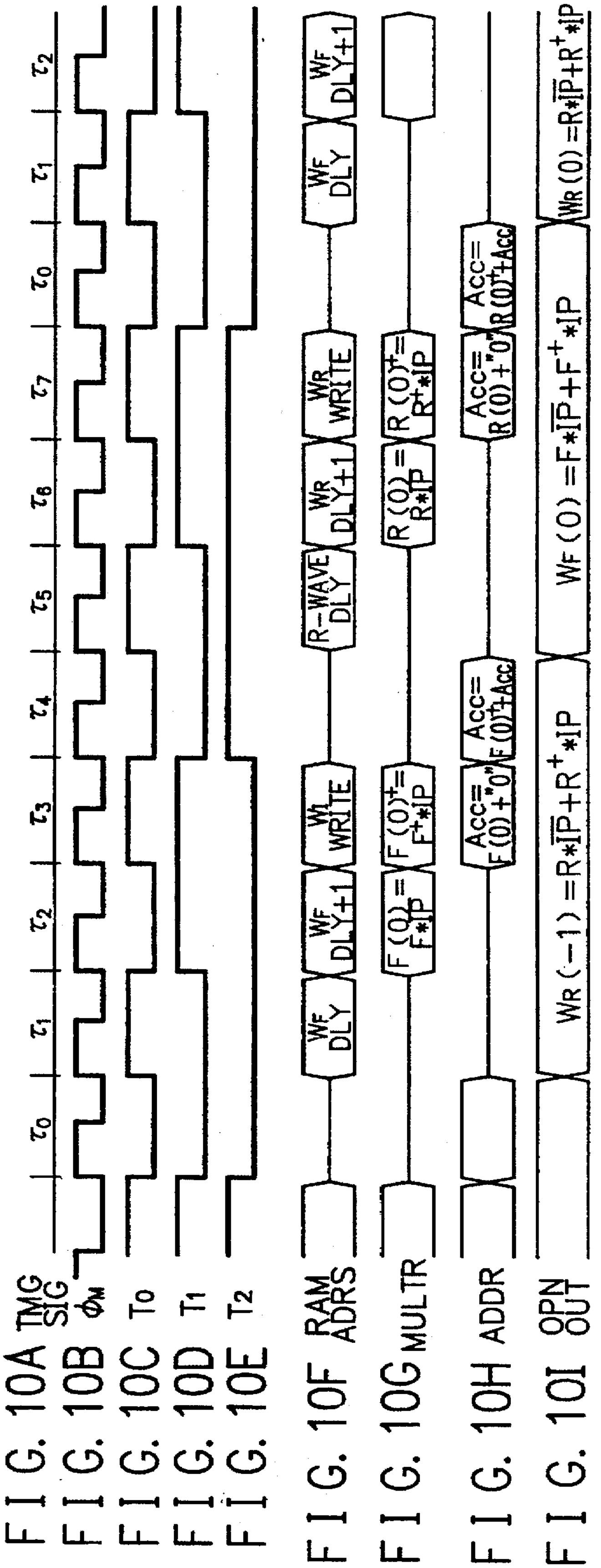
FIGS. 10A to 10I are timing charts of tubing length control.

The operation unit 66 shown in FIG. 6 will be described below. FIG. 9 shows the operation unit 66 in this embodiment. The fractional part of a delaying coefficient from the above-mentioned delaying coefficient generator 62 is input to an interpolation coefficient generator 91 in the operation unit 66 to generate interpolation coefficients IP and IP' (' indicates inversion). The interpolation coefficient generator 91 may adopt a method of controlling to output a ones complement by logical EX-OR, but may generate interpolation coefficients using a ROM.

The interpolation coefficients IP and IP', and RAM output data are respectively latched by latches 92 and 93 in response to the leading edge of a signal $\phi_M$, and are multiplied with each other by a multiplier 94. The product from the multiplier 94 is latched by a latch 95. The product F*IP' is added to the contents of a latch 96, which has been cleared at the second timing $\tau_1$, by an adder 97. The sum is latched by the latch 96 in response to the trailing edge of the third timing signal $\tau_2$, and is added to $F^+$*IP at the fourth timing $\tau_3$. The sum is latched by a latch 98 as a final operation result ($W_F$ free-traveling wave), and is then output. The same operations as described above are performed at the timings $\tau_5$ to $\tau_7$ to achieve interpolation operations of a reflected wave ($W_R$ reflected wave), as a matter of course.

According to the present invention, as described above, the first and second actuators and the first and second sensors are arranged in the straight pipe portion of the wind instrument, and the first and second delay lines are also arranged. The output from the first sensor, which is electronically delayed by the first delay line, is supplied to the second actuator, and the output from the second sensor, which is electronically delayed by the second delay line, is supplied to the first actuator. Thus, the pitch control operation performed in the straight pipe portion of a wind instrument can be electronically realized. Therefore, a wind instrument can be constituted without a mechanical pitch change mechanism such as a valve system or a slide mechanism in brasses or a key system in a woodwind, which is required to have very high working precision and to perform hard operations. Therefore, a mechanical wear or failure caused by a pitch control operation can be prevented, and stable performance can be obtained semi-permanently. Since such an electronic wind instrument can be played by the same blowing method and tone generation method as in acoustic wind instruments, a strange feeling experienced when the pitch is changed electronically can be avoided.

When digital delay lines are used as the electronic delay lines, a pitch variation caused by a change in temperature can be prevented unlike in acoustic wind instruments.

The second embodiment of the present invention will be described below with reference to the accompanying drawings.

Figure 11:
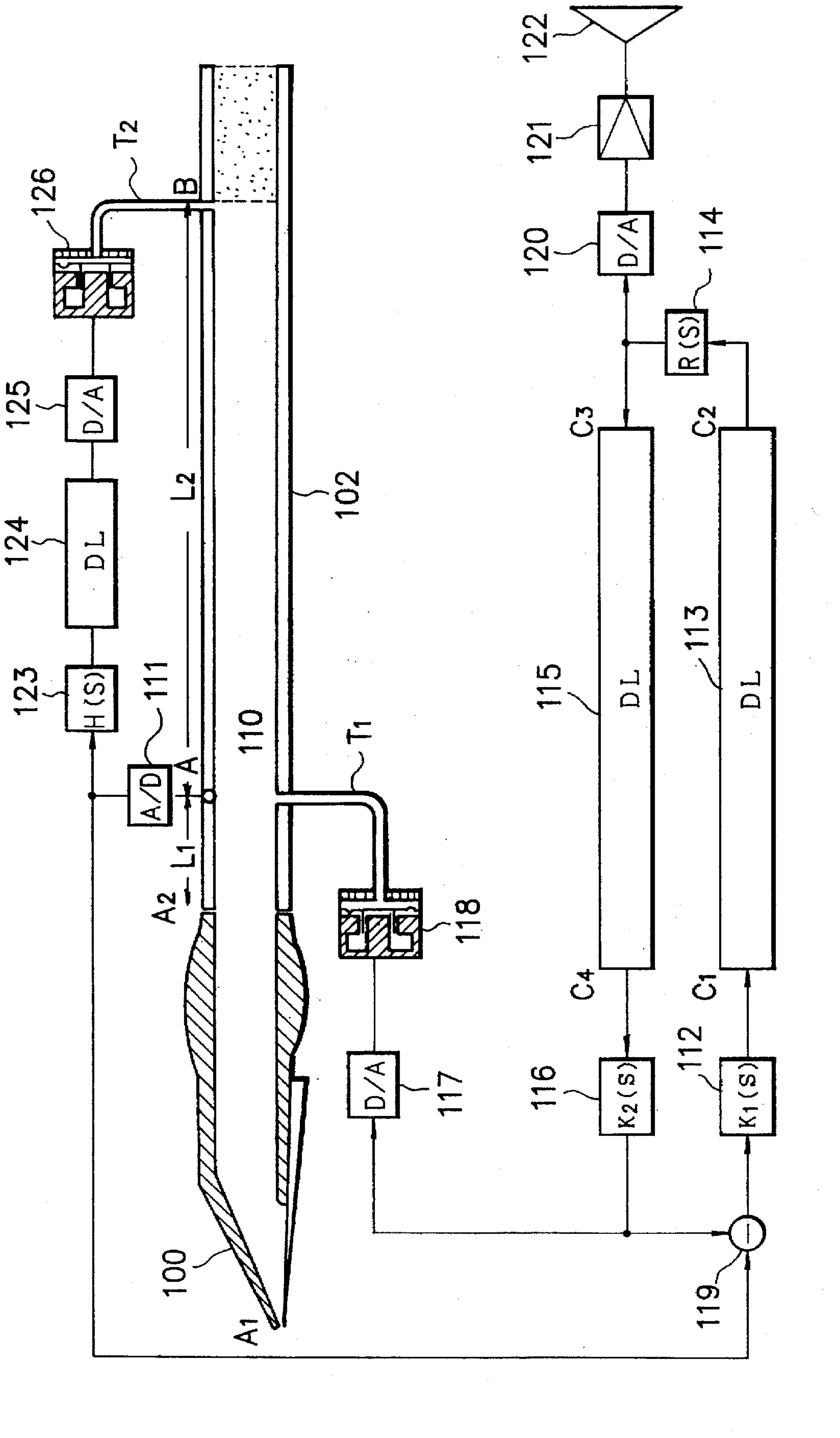
FIG. 11 is a block diagram showing a wind instrument having means for electronically processing an acoustic signal according to the second embodiment of the present invention.

FIG. 11 is a block diagram showing a wind instrument having means for electronically processing an acoustic signal according to the second embodiment in which the present invention is applied to a reed instrument such as a clarinet. Note that the same arrangement as in this embodiment applies to a woodwind (a musical instrument having a bell flare portion at the other end which is constituted by an almost straight pipe) such as a flute and the like.

Referring to FIG. 11, a portion extending from a point $A_1$ to a point $A_2$ of a wind instrument having means for electronically processing an acoustic signal is a mouthpiece portion ($A_1$–$A_2$ portion) 100 to which a reed is locked. A portion extending from the point $A_2$ to a point B is a straight pipe portion ($A_2$–B portion) 102 having an identical pipe diameter, and the straight pipe portion 102 is constituted by a portion ($A_2$–A portion) extending from the point $A_2$ to a point A and having a length $L_1$, and a portion (A–B portion) extending from the point A to the point B and having a length $L_2$. The portion with the length $L_1$ has a length to be acoustically added to the tubing length, while the portion with the length $L_2$ is arranged to form an acoustic non-reflection end at the point B.

On the section at the point A, a sensor 110 and a driving end of a first actuator 118 are arranged. The sensor 110 is used for detecting the pressure (or the particle velocity) in the pipe, and is buried in the pipe wall so as not to disturb vibrations of an air column. The first actuator 118 drives a pipe air column via a high-impedance thin pipe $T_1$ having an acoustic impedance $Z_S$.

Reference numerals 113 and 115 respectively denote first and second electronic delay lines whose delay times (delay amounts) can be freely changed in correspondence with notes (pitches), as will be described later.

The propagation state of sound waves in the wind instrument having means for electronically processing an acoustic wave according to this embodiment will be described below. Note that approximation analysis of an acoustic system is substantially the same as that in the first embodiment.

A pressure wave blown by a player from the point $A_1$ as the entrance of a mouthpiece 100 drives a reed and causes a variation in pressure or flow rate in the mouthpiece 100. The variation reaches the mouthpiece end, i.e., the point $A_2$ as the entrance of the straight pipe 102. Note that the waveform of the sound pressure wave at the point $A_2$ is represented by $P_0(t)$ and its Laplace-transformed form is represented by $P_0(s)$.

The sound pressure wave $P_0(s)$ propagates in the $A_2$–A portion, and reaches the point A. A wave given by $P_0(s)\epsilon^{L1}$ is input from the mouthpiece 100 side to the point A due to the presence of a delay time corresponding to the length $L_1$ between the points $A_2$ and A. Note that e is given by equation (1) in the first embodiment, and c in equation (1) represents the sound velocity. On the other hand, T is a term associated with the loss of a pipe path. In this case, if the pipe path is considered lossless by approximation, $T\rightarrow\infty$, and therefore, $1/T\approx 0$ may be set.

The wave input to the point A travels to the right and reaches the point B. In this embodiment, since the acoustic non-reflection end is formed at the point B, no reflected wave returns from the point B. Note that the acoustic non-reflection end can be formed by driving, for a sound pressure $P_A(s)$ at the point A, the mechanical system of a second actuator 26 by:

$$P_S=Z_S/Z_A(1-Z_A/Z_C)P_A(s)\epsilon^{L2}$$

The sound wave $P_0(s)\epsilon^{L1}$ input to the point A is converted into an electrical signal by the sensor 110 buried in the inner wall of the pipe body on the section at the point A. This electrical signal is converted into a digital signal by an A/D converter 111, and the digital signal is input to an input point $C_1$ of the first electronic delay line 113 via a buffer filter circuit 112 having a transfer function $K_1(s)$.

If the delay length of the first electronic delay line 113 is represented by d, the output signal from the first electronic delay line 113 is output from an output point $C_2$ as an electrical signal $K_1(s)P_0(s)\epsilon^{L1+d}$.

This output is supplied to an input point $C_3$ of the second electronic delay line 115 via a digital filter circuit 114 having an impedance R(s) corresponding to the radiation impedance at the opening end of the wind instrument. Normally, since the distal end of a woodwind such as a clarinet, flute, or the like can be approximated by an opening end, a reflection coefficient for a sound pressure becomes $m_H(s)\approx -1$, and the digital filter circuit 114 serves as a simple phase inversion circuit. Therefore, the above-mentioned pressure wave is converted to $-K_1(s)P_0(s)\epsilon^{L1+d}$, and the converted signal is supplied to the input point $C_3$ of the second electronic delay line 115. This signal is delayed by the delay length d equivalent to that of the first electronic delay line 113, and the delayed signal $-K_1(s)P_0(s)\epsilon^{L1+2d}$ is output to an output point $C_4$.

This signal is converted into an analog signal by a D/A converter 117 via a buffer filter circuit 116 having a transfer function $K_2(s)$, and the analog signal is supplied to the voltage terminal of the first actuator 118 as a driving voltage $-K_1(s)K_2(s)P_0(s)\epsilon^{L1+2d}$.

A wave which is generated by the first actuator 118 at the point a in the straight pipe 102, and propagates to both the sides from the point A will be described below with reference to FIG. 12. Note that the force which acts on a diaphragm **118*a* of the first actuator 118** upon application of a driving voltage is represented by $P_S$ as a sound pressure.

Figure 12:
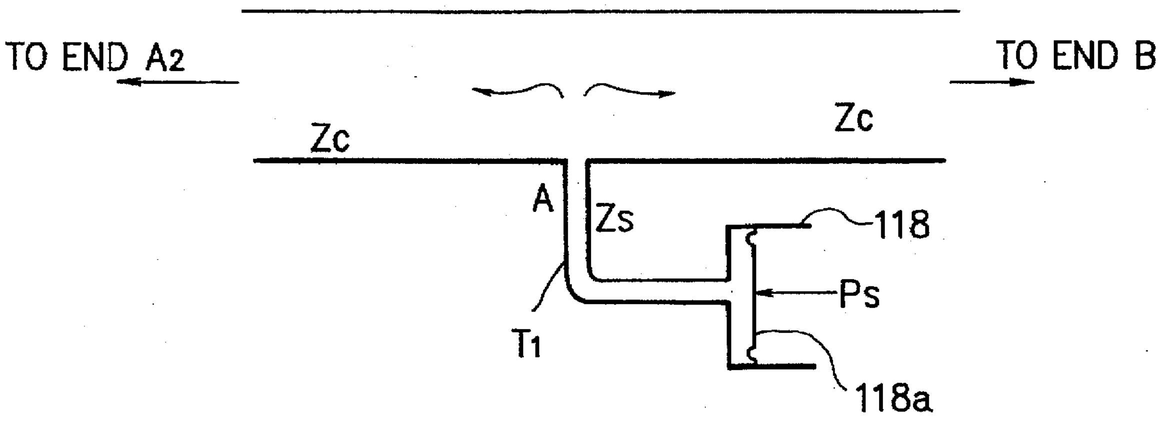
FIG. 12 is a schematic view of an acoustic system for explaining the driving operation of an actuator for converting an output signal from electronic delay lines into a sound pressure signal.

FIG. 12 shows a state wherein the output from the first actuator 118 is supplied to the straight pipe 102 of the wind instrument via the thin impedance pipe $T_1$ having the acoustic impedance $Z_S$. Note that the equivalent circuit of FIG. 12 is the same as those illustrated in FIGS. 2B and 2C in the first embodiment.

As can be seen from the equivalent circuit shown in FIG. 2C, a volume velocity given by the following equation is generated at the point A:

$$V_S=P_S/(Z_S+Z_C/2)$$

A sound pressure generated based on this volume velocity is given by:

$$P_S'=[P_S/(Z_S+Z_C/2)]\cdot Z_C/2$$

However, when the acoustic impedance $Z_S$ of the impedance pipe $T_1$ is set to be sufficiently larger than the characteristic acoustic impedance $Z_C$ of the straight pipe 102 ($Z_S \gg Z_C$), $P_S'$ is rewritten as:

$$P_S' = \frac{1}{2} \cdot (Z_C/Z_S) \cdot P_S$$

Since $P_S$ is proportional to the driving voltage of the first actuator 118, if the constant of proportionality is represented by α, a sound pressure given by the following equation is generated at the point A:

$$P_S' = -\frac{1}{2} \cdot (Z_C/Z_S) \cdot \alpha \cdot K_1(s) K_2(s) P_0(s) \epsilon^{L1+2d},$$

Therefore, by adjusting the transfer functions $K_1(s)$ and $K_2(s)$ of the buffer filter circuits 112 and 116 to satisfy:

$$K_1(s) K_2(s) = (2/\alpha)(Z_S/Z_C)$$

a state wherein a sound pressure wave $-P_0(s)\epsilon^{L1+2d}$ reflected by an opening end B returns to the point A can be equivalently formed at the point A.

This sound pressure wave propagates in the directions of the points $A_2$ and B. In this embodiment, since an acoustic non-reflection end is formed at the point B, as described above, the wave traveling in the direction of the point B does not return to the point B again. On the other hand, when the sensor 110 detects this wave and enables a route for driving the first electronic delay line 113 again, the generated waves become different from those generated in an actual physical system. In order to prevent this, in this embodiment, a subtracter 119 is arranged to subtract the signal returning to the first actuator 118 from the signal detected by the sensor 110.

On the other hand, the wave propagating from the point A in the direction of the point $A_2$ is reflected at the point $A_2$ as a joint end between the mouthpiece portion 100 and the straight pipe 102, and returns to the point A again. If the acoustic impedance function of the $A_2$–A portion is represented by $Z_m(s)$, the reflection coefficient at the point $A_2$ is expressed as:

$$m_M(s) = (Z_m - Z_C)/(Z_m + Z_C)$$

Therefore, in consideration of a delay time due to the route of the wave, a sound pressure wave $-m_m(s)P_0(s)\epsilon^{3L1+2d}$ returns from the mouthpiece side to the point A.

As described above, in the wind instrument, since propagation and reflection of waves are successively repeated, a sound pressure wave propagating from the mouthpiece side to the point A is given by:

$$P_1(s) = P_0(s)\epsilon^{L1}[1 - m_M\epsilon^{2(L1+d)} + m^2_M\epsilon^{4(L1+d)} - \ldots]$$

On the contrary, a sound pressure wave which propagates from the other end or the bell flare side to the point A is given by:

$$P_2(s) = -P_0(s)\epsilon^{L1}\epsilon^{2d}[1 - m_M\epsilon^{2(L1+d)} + m^2_M\epsilon^{4(L1+d)} - \ldots]$$

If L as the length (total straight pipe length) of the effective straight pipe portion of an acoustic musical instrument is given by $L = L_1 + d$, the sound pressure at the point A is given by the following equation (12):

$$P_A(s) = P_0(s)\epsilon^{L1}[1 - \overrightarrow{m_M}\epsilon^{2L} + m^2_M\epsilon^{4L} - \ldots] + P_0(s)\epsilon^{2L-L1}[1 - \overleftarrow{m_M}\epsilon^{2L} + m^2_M\epsilon^{4L} - \ldots] \quad (12)$$

Figure 13:
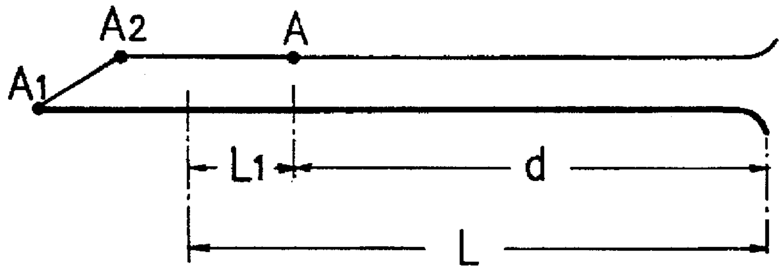
FIG. 13 is a schematic view for explaining the total straight tubing length of a wind instrument.

Equation (12) expresses the Laplace-transformed form of a sound pressure at one point A of the straight pipe portion having the length L from the mouthpiece portion 100 to the distal end portion, as shown in FIG. 13. A portion having the partial length d at the distal end side of the total straight pipe length L is replaced by the electronic delay lines, as described above. Therefore, as will be described later, by electronically controlling the delay times of the first and second electronic delay lines 113 and 115, a wind instrument having means for electronically processing an acoustic signal can be constituted while leaving a performance input portion constituted by a nonlinear vibration system, i.e., the reed and the mouthpiece as that of an acoustic musical instrument. Note that an acoustic signal is output in such a manner that the output from the digital filter circuit 114 is converted into an analog signal by a D/A converter 120, the analog signal is amplified to a predetermined level by an amplifier 121, and a loudspeaker 122 is driven by the amplified signal.

The acoustic non-reflection end arranged at the point B in this embodiment will be described below. If a pipe which has the same diameter as that of the straight pipe and an infinite length is arranged at the point B, since the sound wave is not reflected at this point nor returns, the point B can serve as an acoustic non-reflection end. However, in practice, even when a pipe having an infinite length is not used, reflection in a required frequency band can be suppressed using a pipe having a length large enough to be regarded as an infinite length pipe by approximation or using an appropriate absorption material at the point B. When a sufficiently long pipe is used, the pipe can be placed in a relatively small space if it has a spiral shape.

On the other hand, an acoustic non-reflection end can be formed at the point B using active means. This will be explained below.

The sound pressure $P_A(s)$ at the point A is given by equation (12) above, and a sound pressure P(s,x) and a volume velocity $V_S(s,x)$ at a point separated by a distance x from the point A toward the point B are expressed by equations (3) and (4) as in the first embodiment.

Figure 14A:
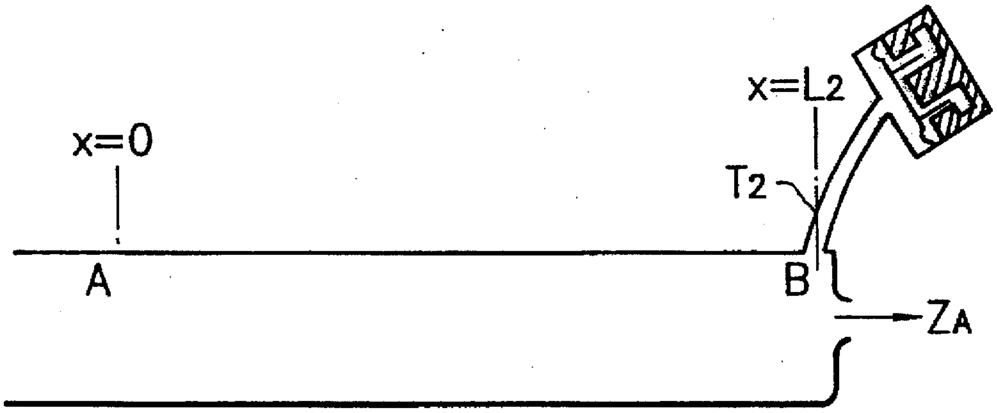
FIG. 14A is a schematic view for explaining the driving operation of an actuator at an acoustic non-reflection end.
Figure 14B:
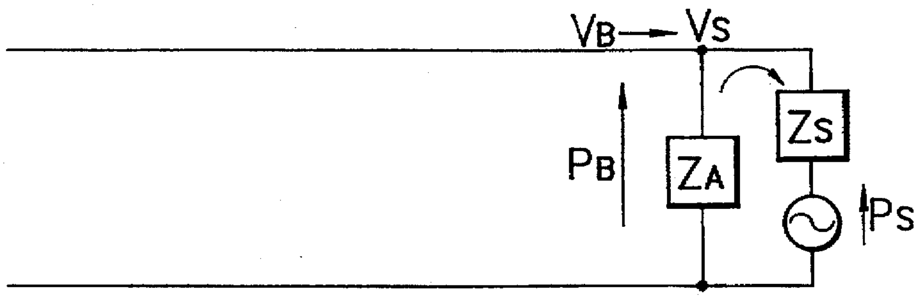
FIG. 14B is a diagram showing an equivalent circuit of FIG. 14A.

FIG. 14A shows a state wherein a secondary sound source is given from the actuator to the straight pipe via an impedance pipe having an impedance $Z_S$ by an acoustic driving force $P_S$. FIG. 14B shows an equivalent circuit of FIG. 14A. From FIG. 14B, a sound pressure $P_B$ and a volume velocity $V_B$ at the point B, a volume velocity $V_S$ given from the secondary sound source, and an acoustic impedance $Z_A$ at the pipe end satisfy the following relationship:

$$P_B = P_S + Z_S V_S = Z_A(V_B - V_S)$$

Therefore, the volume velocity $V_S$ is given by:

$$V_S = (Z_A V_B - P_S)/(Z_A + Z_S)$$

and the following equation (13) is established:

$$P_B = \frac{(P_S + V_B Z_S) Z_A}{Z_A + Z_S} \quad (13)$$

In this embodiment, since $Z_S \gg Z_A$, i.e., the actuator is driven via an impedance pipe $T_2$ having a sufficiently large impedance $Z_S$, we have:

$$P_B \approx P_S \cdot (Z_A/Z_S) + V_B Z_A$$

Therefore, from the following boundary conditions:

$P(s,0) = P_A(s)$ when $x=0$ $P(s,L_2) = P_B = P_S \cdot (Z_A/Z_S) + V_B Z_A$ when $x = L_2$ the following equation and equation (6) are established as in the first embodiment:

$$P_A(s)=a+b$$

From these two equations, since the amplitude b(s) of the reflected wave is given by equation (7), equation (8) is established from a non-reflection condition b=0.

Therefore, if the actuator is driven by $P_S$ given by equation (8) as a sound pressure, reflected waves are removed since they cancel each other, and a non-reflection end is formed at the point B. More specifically, a signal proportional to the sound pressure $P_A(s)$ detected by the sensor 110, arranged at the point A, is converted into a digital signal by the A/D converter 111, and the digital signal, which is delayed by a third electronic delay line 124 equivalently having a delay length $L_2$ via a digital filter circuit 123 having a transfer function $H(s)=(Z_S/Z_A)(1-Z_A/Z_C)$, is converted into an analog signal by a D/A converter 125 to drive a second actuator 126, thus forming an acoustic non-reflection end at the point B.

On the other hand, when $Z_A \gg Z_S$, for example, when the terminal end of the point B is a closed pipe, from equation (5), we have:

$$P_B=(P_S+V_BZ_S)Z_A/Z_A=P_S+V_BZ_S$$

Therefore, from the following boundary conditions:

$P(s,0)=P_A(S)$ when $x=0$ $P(s,L_2)=P_B=P_S+V_BZ_S$ when $x=L_2$ from equations (3) and (4), the following equation and equation (9) are established as in the first embodiment:

$$P_A(s)=a+b$$

From these two equations, since the amplitude b(s) of the reflected wave is given by equation (10), the following equation (14) is established as in equation (11) of the first embodiment from a non-reflection condition b(s)=0:

$$P_S=\left(1-\frac{Z_S}{Z_C}\right)P_A(s)e^{-(s+\frac{1}{T})\frac{L2}{C}} \quad (14)$$

Therefore, if the actuator is driven by $P_S$ given by equation (14) as a sound pressure, reflected waves are removed since they cancel each other, and a non-reflection end is formed at the point B. More specifically, a signal proportional to the sound pressure $P_A(S)$ detected by the sensor 110, arranged at the point A, is converted into a digital signal by the A/D converter 111, and the digital signal, which is delayed by the third electronic delay line 124 equivalently having a delay length $L_2$ via a digital filter circuit 123 having a transfer function $H(s)=(1-Z_S/Z_C)$, is converted into an analog signal by the D/A converter 125 to drive the second actuator 126, thus forming an acoustic non-reflection end at the point B.

In this embodiment, each of the first and second actuators 118 and 126 is constituted by attaching, to the distal end side of a diaphragm, a thin pipe which is formed to have a small diameter to generate a sound pressure via an impedance pipe having an impedance $Z_S$ sufficiently higher than the characteristic acoustic impedance $Z_C$ of the straight pipe portion 102 of the instrument main body, and is packed with an appropriate resistance material as needed.

It is preferable that the acoustic non-reflection end generates no sound to an external portion in practice. Therefore, the acoustic non-reflection end must be designed to pass a sound wave through a large resistance component, to reduce the radiation efficiency of a sound from this end by constricting the pipe, or to be a closed end.

Furthermore, in order to eliminate reflection from the acoustic non-reflection end B, the digital filter circuit 123 having the above-mentioned transfer function:

$$H(s)=(Z_S/Z_A)\ (1-Z_A/Z_C)$$

or $$H(s)=(1-Z_S/Z_C)$$

is used in correspondence with the relationship between the radiation acoustic impedance $Z_A$ at that end and the acoustic impedance $Z_S$ of the impedance pipe. However, the transfer function of the digital filter circuit 123 must be finely adjusted due to a change in sound velocity, a change in dimensions, or the like due to a change in temperature. Therefore, in a performance, it is preferable that the transfer function H(s) of the digital filter circuit 123 and the characteristics of the third electronic delay line 124 are adjusted, such that a short pulse-shaped waveform is blown in advance from the mouthpiece end $A_1$, and reflected pulses obtained when the blown waveform passes the point A, is reflected at the point B, and returns to the point A become almost zero.

A mechanism for changing the tubing length of the straight pipe portion in FIG. 11 will be explained below with reference to an example shown in FIG. 15, which is similar to that shown in FIG. 5. Note that this embodiment is applied to a trumpet in FIG. 15, but may be modified to match a reed instrument shown in FIG. 11, as a matter of course. For example, the tubing length of a trumpet is changed in seven stages by operating a valve system. On the other hand, the tubing length of a trombone continuously changes, but normally has seven slide positions. Therefore, for these musical instruments, the delay times of the above-mentioned electronic delay lines must be changed in seven stages at half-note intervals. However, when the pitch continuously changes to have a predetermined width by operating, e.g., a trigger, the delay times must be finely adjusted. For example, in a trumpet, a function of finely adjusting the delay times on the basis of a resistance or voltage value which changes in synchronism with the movement of a third valve slide with a trigger, as will be described later is required.

Figure 15:
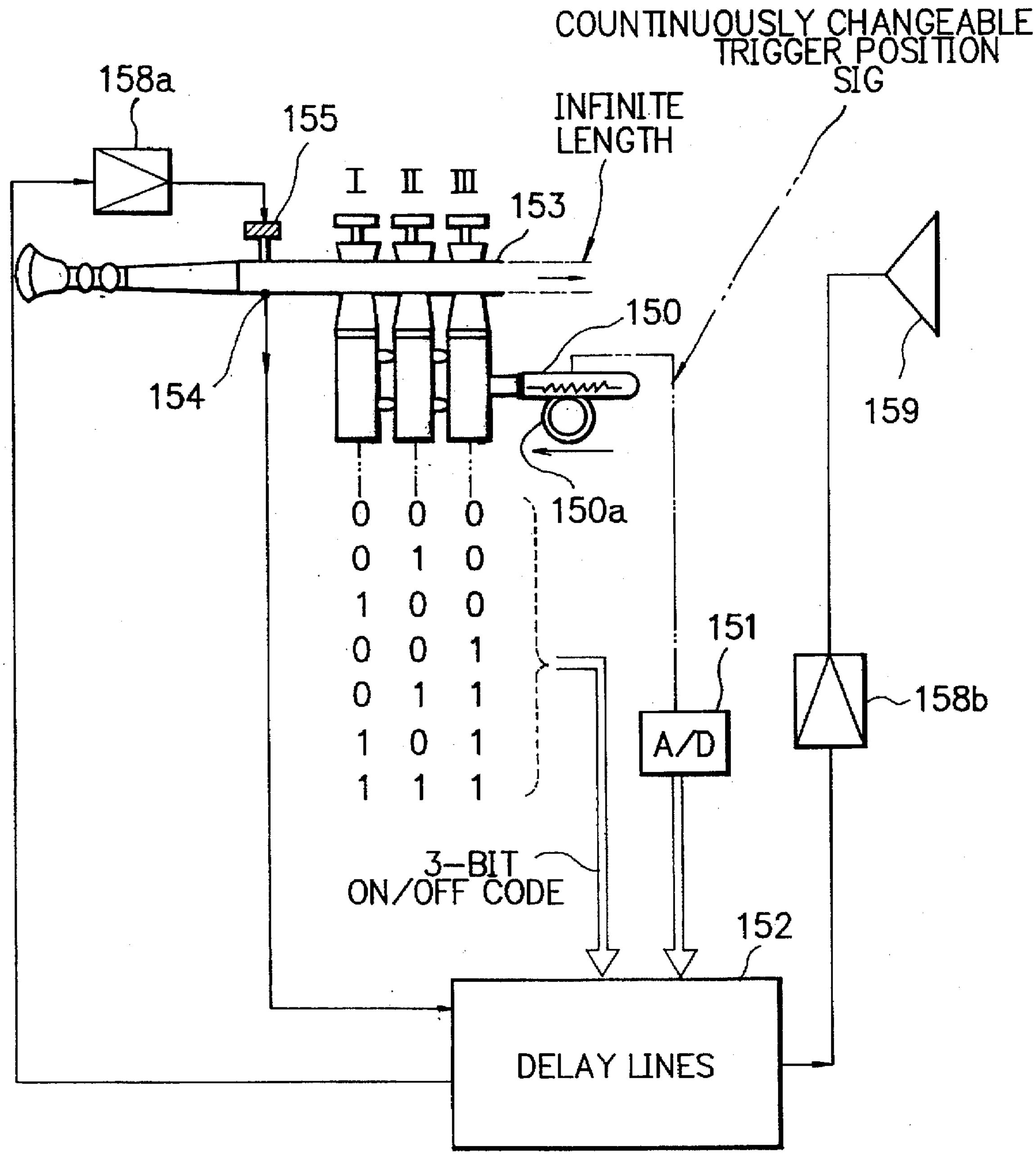
FIG. 15 is a block diagram showing a wind instrument having means for electrically processing an acoustic signal using scale codes generated in correspondence with the ON/OFF states of pistons of a trumpet.

FIG. 15 shows a tubing length control system of a trumpet, which structurally comprises switches for detecting the ON/OFF states of three pistons I, II, and III in a valve system. This trumpet uses a valve system, a slide pipe, and a key mechanism, which are arranged to have the same shape and the same interval as those of an acoustic trumpet, and make the same motions. An operation during a performance is detected in the form of a binary code, and the binary code is input to the above-mentioned electronic delay line as a scale control code, thus generating a delaying coefficient.

More specifically, as shown in FIG. 15, the operation states of the three pistons I, II, and III are expressed by codes representing ON/OFF states, and a 3-bit binary code is supplied to a delay time control circuit of delay lines 152. On the other hand, a continuous change in position of a trigger 150*a* is detected by a detector 150. The detector 150 shown in FIG. 15 detects the operation state of the trigger 150*a* as an analog amount. Thus, as shown in FIG. 15, the detection output from the detector 150 is converted into a digital signal by an A/D converter 151, and the digital signal is supplied to the delay lines 152.

On a straight pipe 153, a sensor 154 and a first actuator 155 are arranged at a predetermined position set near the mouthpiece side.

A buffer amplifier 158*a* is arranged between the delay line 152 and the first actuator 155 to amplify a signal output from the delay lines 152, and the amplified signal is supplied to the first actuator 155.

Furthermore, a buffer amplifier 158*b* is arranged between the delay lines 152 and a loudspeaker 159, so that the output from the delay line 152 is amplified to a predetermined level, and is then supplied to the loudspeaker 159.

In the trumpet of this embodiment with the above-mentioned arrangement, if a depression (switch on) of a piston is caused to correspond to a code "1", and an up state (switch off) of the piston is caused to correspond to a code "0", the depressed pistons, switch operations, and extension of the tubing length have a relationship thereamong shown in Table 1 of the first embodiment.

Therefore, when a switch code shown in Table 1 above is input to the delaying coefficient generator shown in FIG. 6 as a scale control code input, the tubing length of the straight pipe portion can be controlled. The same method applies to musical instruments (e.g., a reed instrument) other than the trumpet.

A tubing length controller for controlling the length of the straight pipe portion in this embodiment is the same as that shown in FIGS. 6 to 10I, and a detailed description thereof will be omitted.

As described above, according to the present invention, the sensor and the first actuator are arranged in the straight pipe portion of the wind instrument, and the first and second delay lines are arranged, so that the output from the sensor, which is electronically delayed by the first and second delay lines, is supplied to the actuator. For this reason, although an acoustic signal is electrically processed, physical feedback from the instrument can be obtained, and a player can enjoy unification with the instrument as in an acoustic musical instrument. The player can play the instrument as if he or she played an acoustic musical instrument, and a mechanical pitch change mechanism which requires high-precision working and adjustment can be omitted. Therefore, failures are hard to occur, and reliability can be improved.

What is claimed is:

1. An electronic tubing length control apparatus for a wind instrument, comprising:

a first sensor, which is arranged at an entrance portion of a first straight pipe contiguous with a mouthpiece, and converts an acoustic wave traveling from the mouthpiece into an electrical signal;

a first actuator, which is arranged at the entrance portion of said first straight pipe, and converts an input electrical signal into an acoustic wave, and supplying the acoustic wave to the entrance portion of said first straight pipe;

a second sensor, which is arranged at an exit portion of a second straight pipe contiguous with a flare-bell portion, and converts a reflected wave from the exit into an electrical signal;

a second actuator, which is arranged at the exit portion of said second straight pipe, and converts an input electrical signal into an acoustic wave, and supplying the acoustic output to the exit portion of said second straight pipe; and electronic delaying means for delaying the output from said first sensor by a predetermined period of time, and supplying the delayed output to said second actuator, and for delaying the output from said second sensor by a predetermined period of time, and supplying the delayed output to said first actuator.

2. An electronic tubing length control apparatus for a wind instrument, comprising:

a first straight pipe contiguous with a mouth pipe which receives a mouthpiece;

a second straight pipe inserted between said first straight pipe and a flare-bell portion;

a first actuator connected to said first straight pipe to supply an acoustic output to a first predetermined position on the mouth pipe side;

a second actuator connected to said second straight pipe to supply an acoustic output to a second predetermined position on the side of the flare-bell portion;

a first sensor arranged at the first predetermined position on a pipe wall of said first straight pipe;

a second sensor arranged at the second predetermined position on a pipe wall of said second straight pipe;

a first delay line arranged to electronically delay an output from said first sensor; and a second delay line arranged to electronically delay an output from said second sensor, wherein the output from said first sensor, which is electronically delayed by said first delay line, is supplied to said second actuator, and the output from said second sensor, which is electronically delayed by said second delay line, is supplied to said first actuator.

3. The apparatus according to claim 2 wherein said first sensor is arranged near the mouthpiece and said second sensor is arranged near the flare-bell portion.

4. The apparatus according to claim 2 further comprising:

A/D converters for respectively converting output signals from said first and second sensors into digital signals and inputting the digital signals to said first and second electronic delay lines; and D/A converters for respectively converting output signals from said first and second electronic delay lines into analog signals and supplying the analog signals to said first and second actuators.

5. The apparatus according to claim 2 wherein an acoustic impedance of each of fine pipes for respectively connecting said first and second actuators and said first and second straight pipes is sufficiently larger than a characteristic acoustic impedance of each of said first and second straight pipes.

6. The apparatus according to claim 2 further comprising:

a first substracter for subtracting a signal proportional to a signal supplied to said first actuator from the output signal from said first sensor and inputting the signal to said first electronic delay line; and a second subtracter for subtracting a signal proportional to a signal supplied to said second actuator from the output signal from said second sensor and inputting the signal to said second electronic delay line.

7. The apparatus according to claim 2 wherein a terminal end, opposite to the mouthpiece, of said first straight pipe is an acoustic non-reflection end, and a terminal end, opposite to the flare-bell portion, of said second straight pipe is an acoustic non-reflection end.

8. The apparatus according to claim 7 wherein each of the acoustic non-reflection ends comprises a pipe having a length large enough to neglect effect of reflection from the end of the pipe.

9. The apparatus according to claim 7 wherein each of the acoustic non-reflection ends comprises an acoustic actuator.

10. The apparatus according to claim 9 wherein said acoustic actuator comprises a third actuator which is connected to the terminal end, opposite to the mouthpiece, of said first straight pipe via a thin pipe and converts an output signal from a third electronic delay line which receives an output from said first sensor into an acoustic signal, and a fourth actuator which is connected to the terminal end, opposite to the flare-bell portion, of said second straight pipe via a thin pipe, and converts an output signal from a fourth electronic delay line which receives an output from said second sensor into an acoustic signal.

11. The apparatus according to claim 2 further comprising:

means for generating a binary code in correspondence with a setting position of a mechanical tubing length controller, such as a valve system, a slide pipe, or a key mechanism, wherein delay times of said first and second delay lines are changed in correspondence with the binary code.

12. The apparatus according to claim 11 further comprising:

a variable resistor which is interlocked with a setting position of a mechanical tubing length controller such as a trigger device or a slide pipe wherein the delay times are finely adjusted in correspondence with a resistance of said variable resistor.

13. A wind instrument having means for electronically processing an acoustic signal comprising:

an acoustic sensor arranged at a predetermined position on a pipe wall, near a mouthpiece, of a straight pipe to which the mouth piece is coupled;

first electronic delaying means for receiving an output from said acoustic sensor;

a load circuit for inverting an output from said first electronic delaying means and inputting the inverted signal to second electronic delaying means;

a first actuator for receiving the output from said second electronic delaying means and supplying an acoustic output to the predetermined position;

amplifier means for amplifying an output from said load circuit and supplying the amplified signal to a loudspeaker to obtain a musical tone output;

an A/D converter for converting an output from said acoustic sensor into a digital signal and inputting the digital signal to said first electronic delaying means; and a D/A converter for converting an output from said second electronic delaying means into an analog signal and supplying the analog signal to said first actuator.

14. The instrument according to claim 13 wherein an acoustic impedance of a thin pipe for connecting said first actuator and the straight pipe is sufficiently larger than a characteristic acoustic impedance of the straight pipe.

15. The instrument according to claim 13 further comprising:

a subtracter for subtracting a signal proportional to a signal supplied to said first actuator from an output from said acoustic sensor and supplying the difference to said first electronic delaying means.

16. The instrument according to claim 13 wherein a terminal end, opposite to the mouthpiece, of the straight pipe is an acoustic non-reflection end.

17. The instrument according to claim 16 wherein the acoustic non-reflection end comprises a pipe having a length large enough to neglect effect of reflection wave from the end of the pipe.

18. The instrument according to claim 16 wherein the acoustic non-reflection end comprises an acoustic actuator.

19. The instrument according to claim 18 wherein said acoustic actuator comprises a second actuator which is connected to the terminal end, opposite to the mouthpiece, of the straight pipe via a thin pipe, and converts an output signal from a third electronic delay line which receives an output from said acoustic sensor into an acoustic signal.

20. The instrument according to claim 19 further comprising:

means for generating a binary code in correspondence with a setting position of a mechanical tubing length controller, such as a valve system, a slide pipe, or a key mechanism, wherein delay times of said first and second delay lines are changed in correspondence with the binary code.

21. The instrument according to claim 20 further comprising:

a variable resistor which cooperates with a setting position of a mechanical tubing length controller such as a trigger device or a slide pipe wherein the delay times are finely adjusted in correspondence with a resistance of said variable resistor.

* * * * *

UNITED STATES PATENT AND TRADEMARK OFFICE

CERTIFICATE OF CORRECTION

PATENT NO. : 5,668,340

DATED : September 16, 1997

INVENTOR(S) : Hikaru Hashizume et al.

It is certified that error appears in the above-identified patent and that said Letters Patent is hereby corrected as shown below:

Column 9, line 62-63, change "1+2(L4+d)"
to --L1+2(L4+d)--

Column 7, line 63, change "$1/T \approx 0$"
to --$1/T \fallingdotseq 0$--

Column 11, line 46, change "$P_3 \approx$"
to --$P_3 \fallingdotseq$--

Column 12, line 23-24, change "$P_3 \approx$"
to --$P_3 \fallingdotseq$--

Column 13, line 10, change "$Z_Z/Z_C$"
to --$Z_A/Z_C$--

Column 18, line 4, change "$1/T \approx 0)$"
to --$1/T \fallingdotseq 0$--

Column 18, line 31, change $m_H(S) \approx -1$"
to $m_H(S) \fallingdotseq -1$--

Column 19, line 42, change "$m_m$"
to --$m_M$--

UNITED STATES PATENT AND TRADEMARK OFFICE
CERTIFICATE OF CORRECTION

PATENT NO. : 5,668,340

DATED : September 16, 1997

INVENTOR(S) : Hikaru Hashizume et al.

It is certified that error appears in the above-identified patent and that said Letters Patent is hereby corrected as shown below:

Column 20, line 61-62, change "$P_B \approx P_s$"
to --$P_B \fallingdotseq P_s$

Column 20, line 64, change "P(s,o)"
to --P(s,O)--

Column 21, line 21-22, change "$P_B \approx$"
to --$P_B \fallingdotseq$--

Column 21, line 42, change "$P_A$(S)"
to --$P_A$(s)--

Drawings dated 4/9/96
Figure 2A, change "$T_3$" to --$T_2$--

Signed and Sealed this

Twenty-second Day of September, 1998

Attest:

BRUCE LEHMAN

Attesting Officer

Commissioner of Patents and Trademarks